United States Patent [19]
Sato et al.

[11] Patent Number: 5,210,785
[45] Date of Patent: May 11, 1993

[54] WIRELESS COMMUNICATION SYSTEM

[75] Inventors: Hideaki Sato, Yokohama; Toshihiko Myojo, Tokyo, both of Japan

[73] Assignee: Canon Kabushiki Kaisha, Tokyo, Japan

[21] Appl. No.: 316,486

[22] Filed: Feb. 27, 1989

[30] Foreign Application Priority Data

Feb. 29, 1988 [JP] Japan ................................ 63-44572
May 16, 1988 [JP] Japan ............................. 63-116847

[51] Int. Cl.$^5$ ............................................. H04Q 7/04
[52] U.S. Cl. ..................................... 379/58; 379/61; 379/63
[58] Field of Search ............... 379/58, 61, 63; 455/54

[56] References Cited

U.S. PATENT DOCUMENTS

| | | | |
|---|---|---|---|
| 4,573,207 | 2/1986 | Smith et al. | 455/54 |
| 4,661,970 | 4/1987 | Akaiwa | 379/61 |
| 4,672,657 | 6/1987 | Dershowitz | 379/58 |
| 4,712,229 | 12/1987 | Nakamura | 379/58 |
| 4,748,655 | 5/1988 | Thrower et al. | 379/58 |
| 4,776,001 | 10/1988 | Murata et al. | 379/63 |
| 4,796,291 | 1/1989 | Makino | 379/62 |
| 4,802,200 | 1/1989 | Murata et al. | 379/61 |
| 4,837,801 | 6/1989 | Shimura | 379/61 |
| 4,860,337 | 8/1989 | Shimura | 379/63 |
| 4,875,231 | 10/1989 | Hara et al. | 379/61 |
| 4,897,864 | 1/1990 | Murata et al. | 379/63 |
| 4,989,230 | 1/1991 | Gillig et al. | 379/59 |

Primary Examiner—James L. Dwyer
Assistant Examiner—Magdy W. Shehata
Attorney, Agent, or Firm—Fitzpatrick, Cella, Harper & Scinto

[57] ABSTRACT

This invention relates to a wireless communication system, which comprises plural wireless communication units having different communication protocols, and in which a proper wireless communication unit is automatically selected from the plural wireless communication units in accordance with the operation states of the plural wireless communication units to make communication possible. Thereby, troublesome operation is not required, an optimum wireless communication method can be automatically selected, and communication cost can be reduced. In the wireless communication system of the present invention, when mobile stations are registered in a fixed station, preferential orders of the mobile stations are stored, and calling/call-reception and communication processings are controlled according to the preferential orders.

11 Claims, 27 Drawing Sheets

MOBILE UNIT

MOBILE UNIT

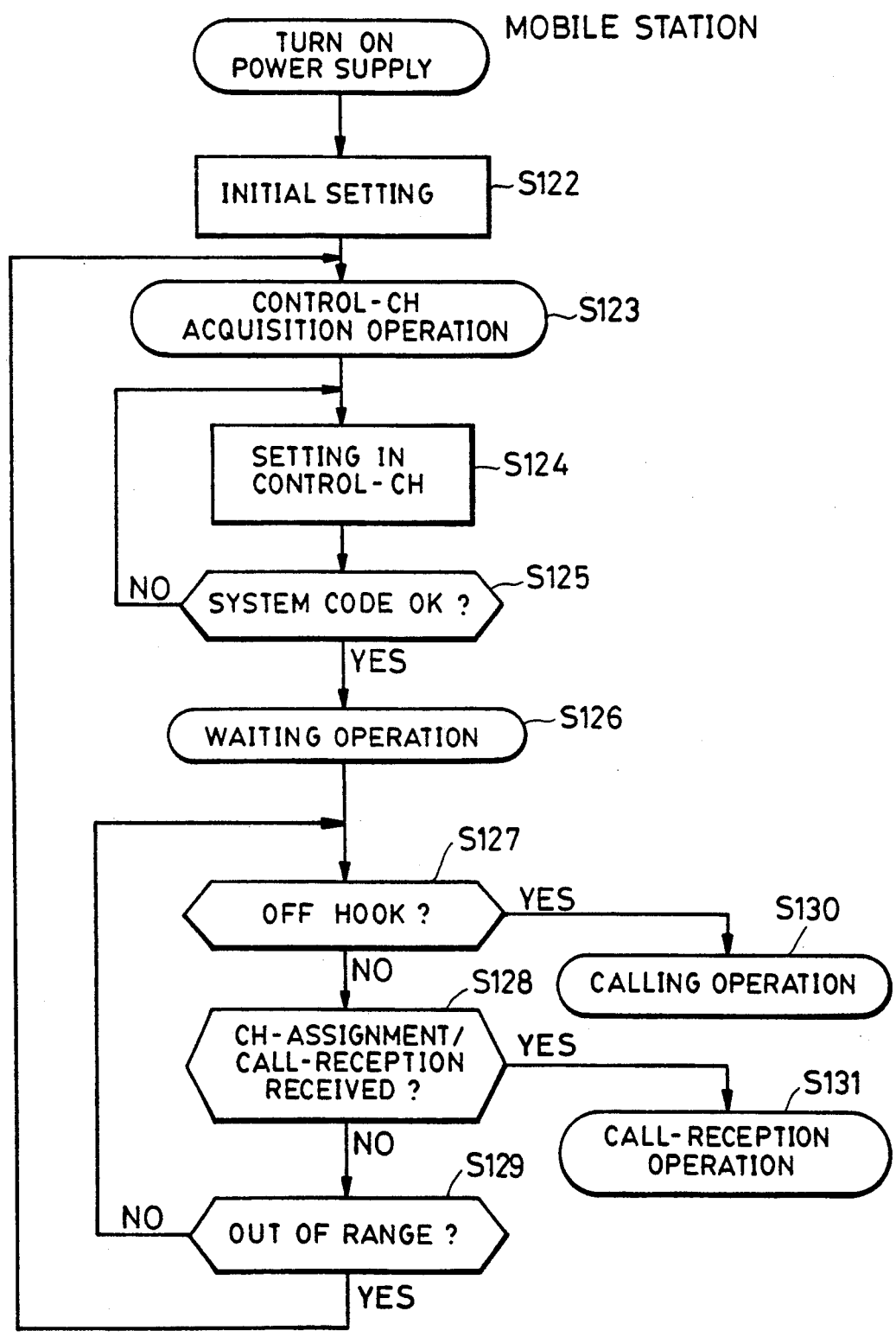

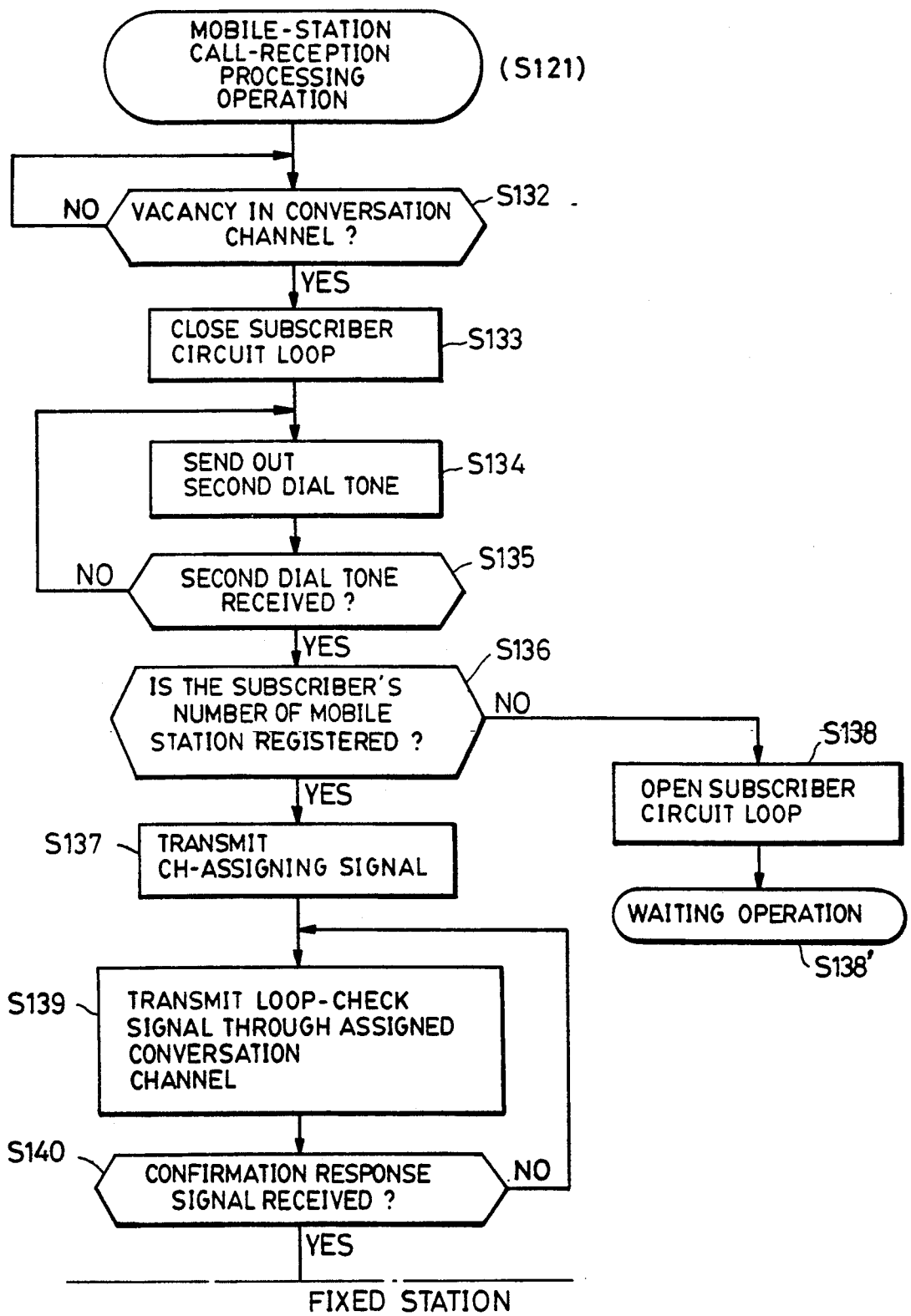
FIG. 11 (A1)

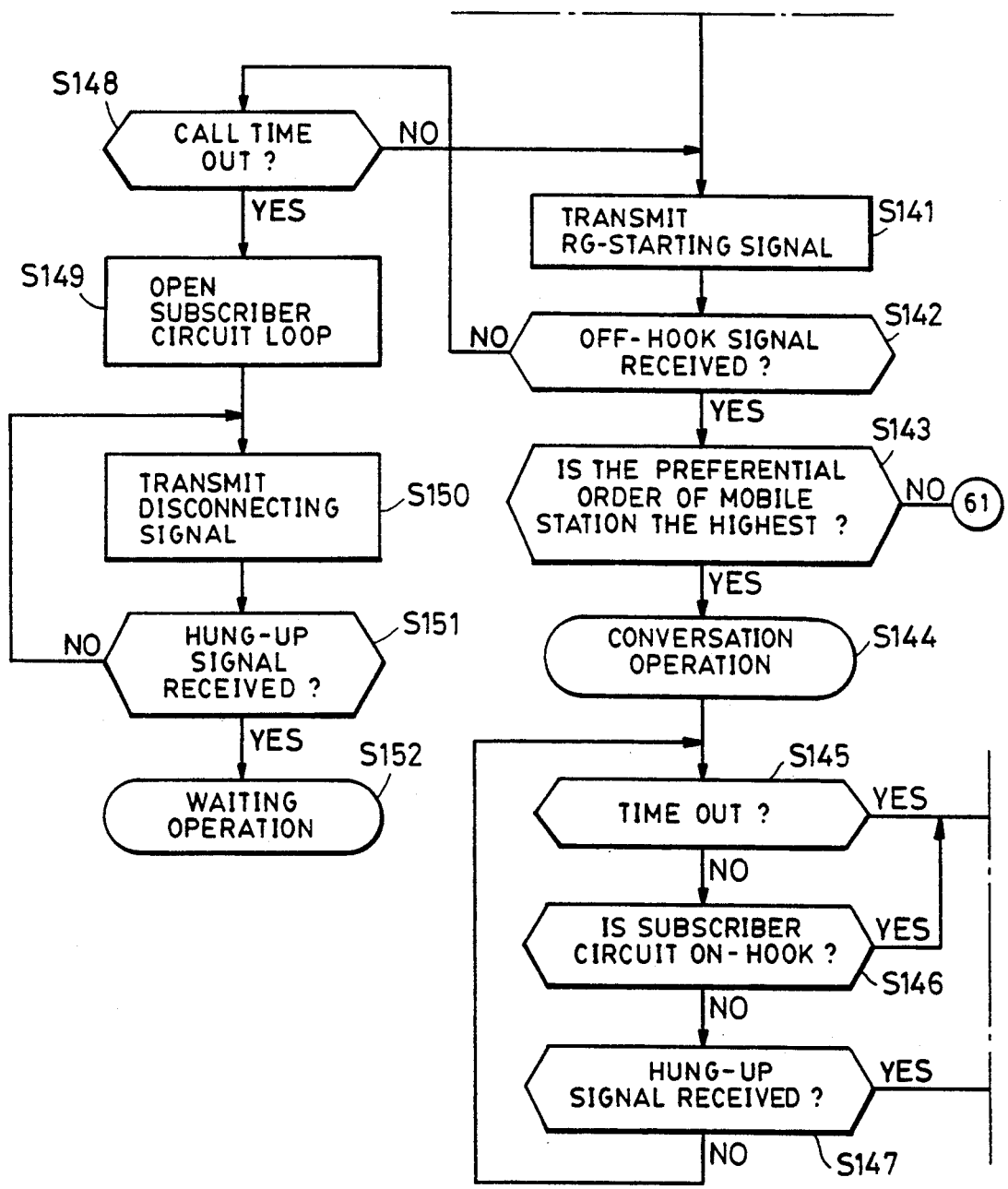
FIG. 11 (A2)

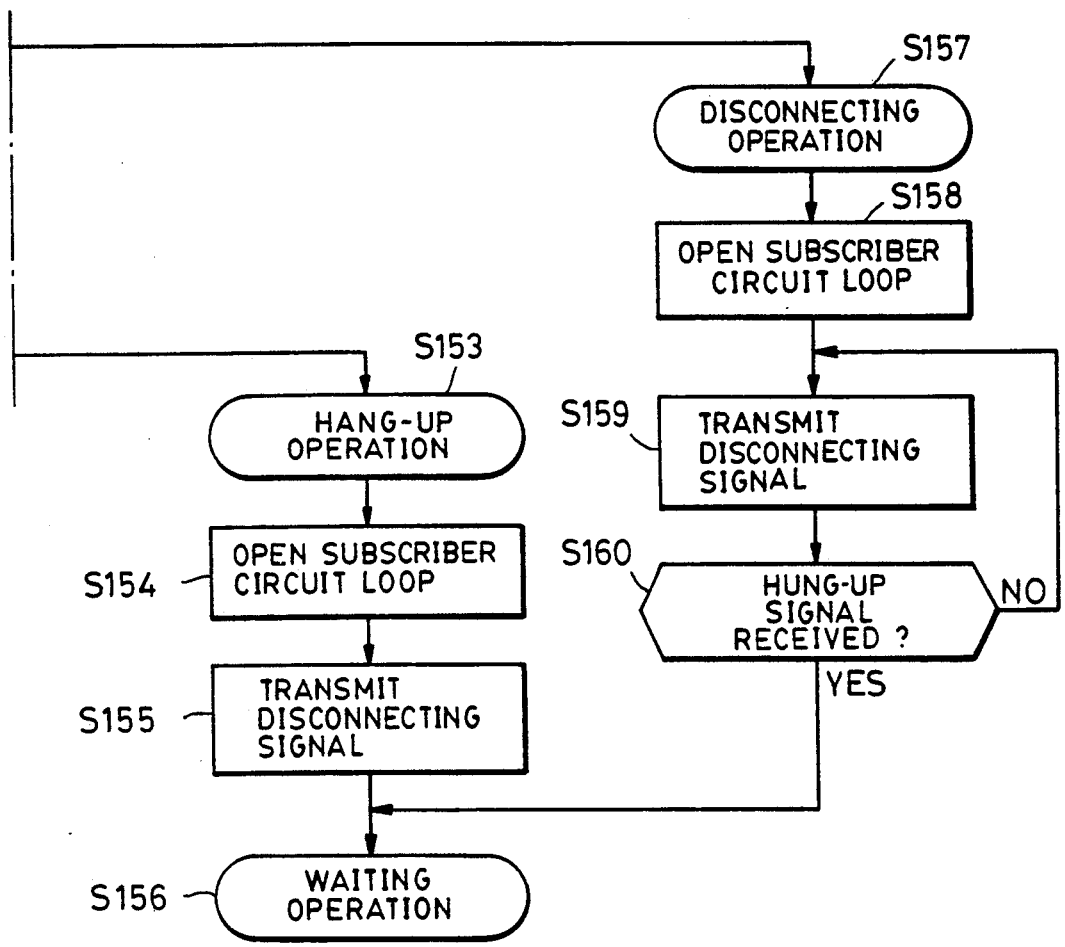

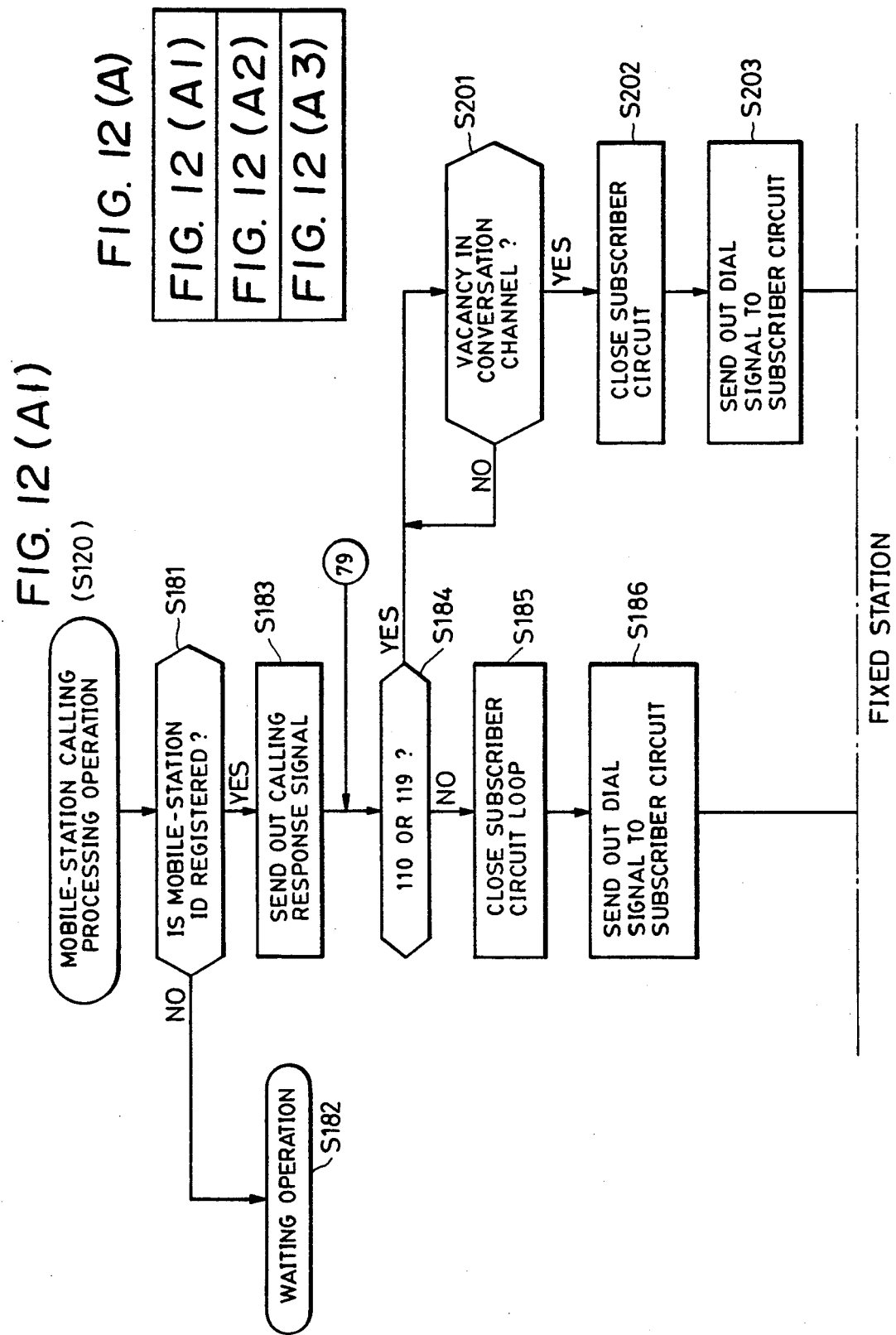

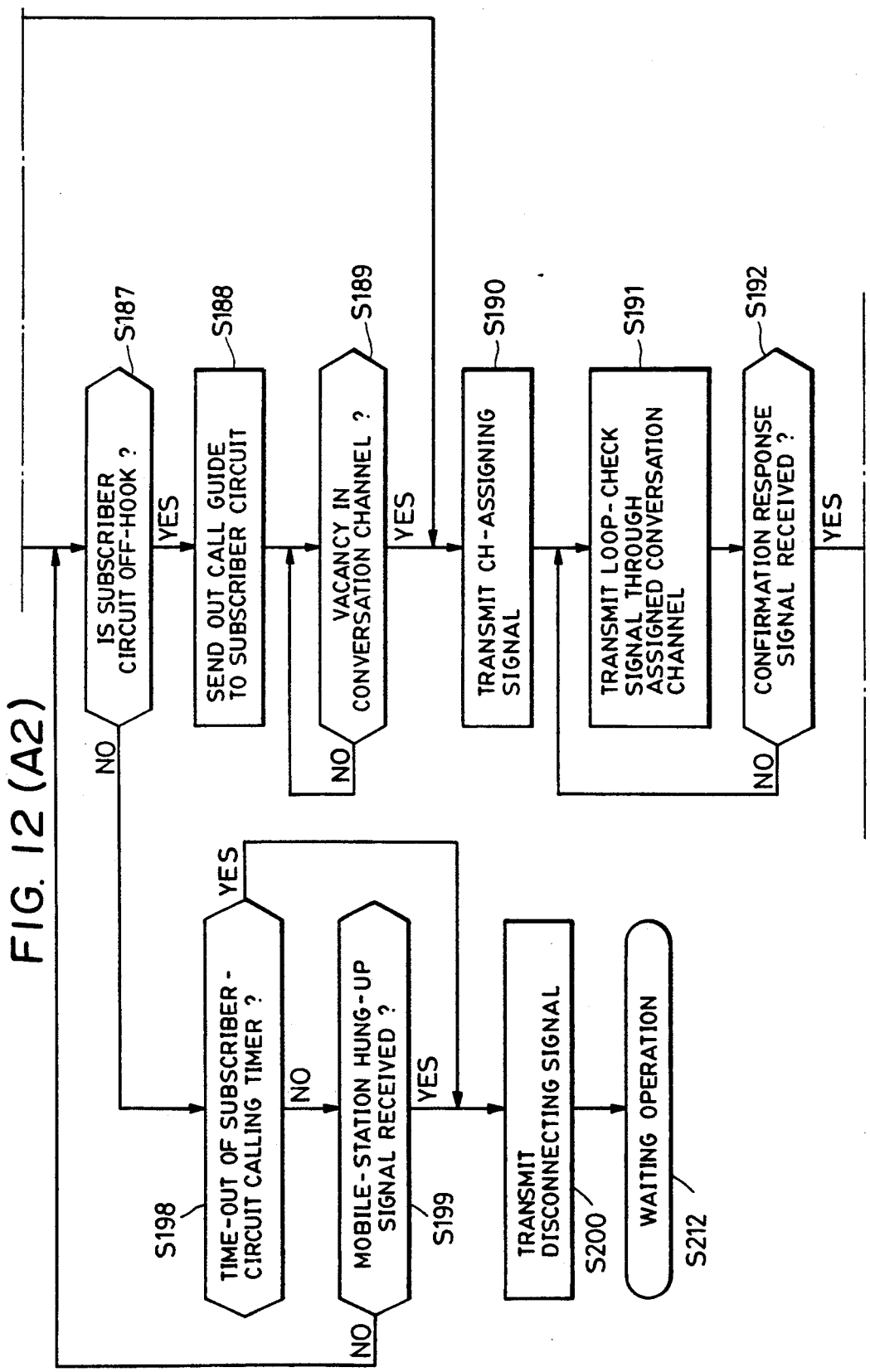
FIG. 12 (A2)

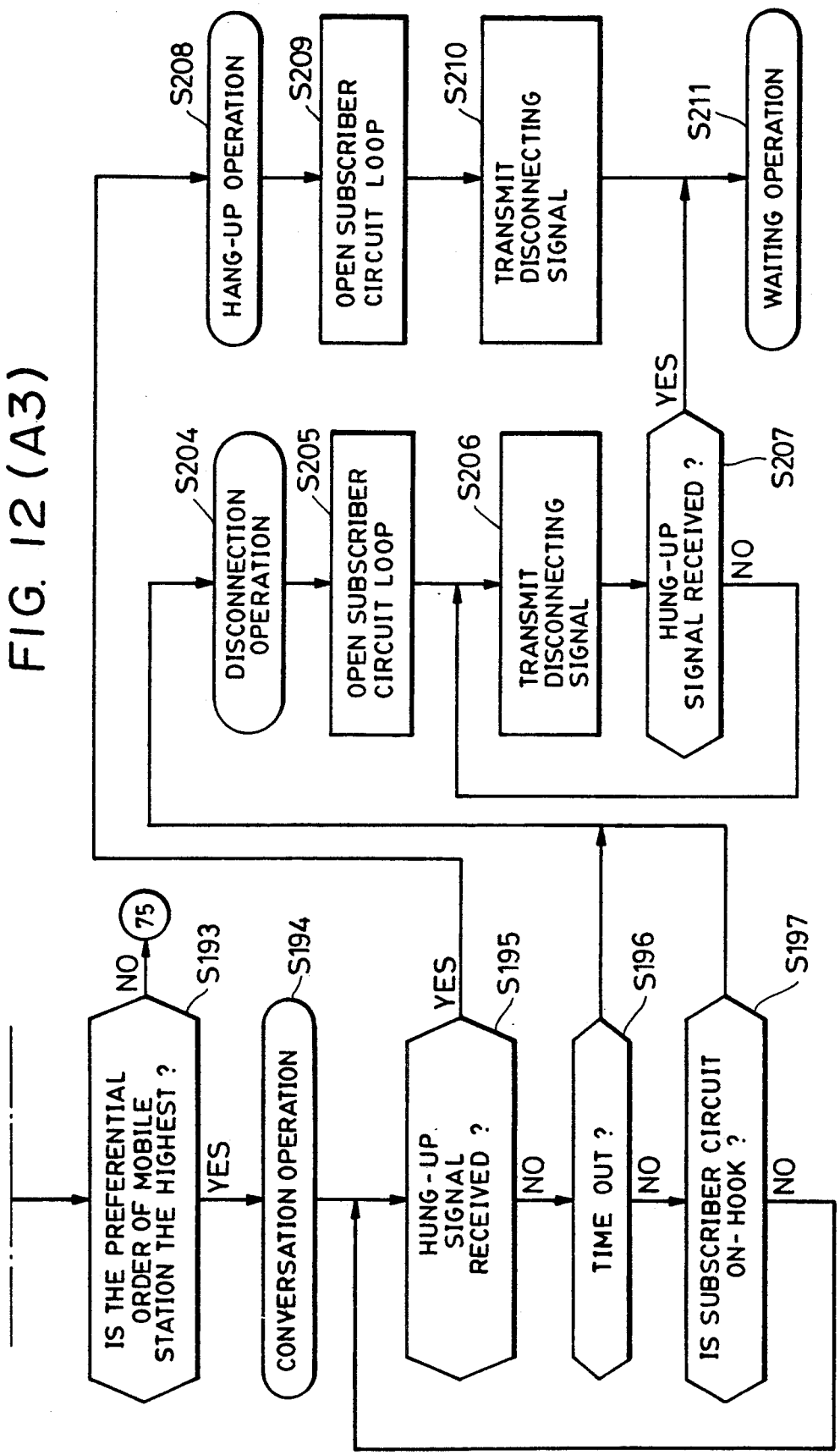
FIG. 12 (A3)

MOBILE STATION

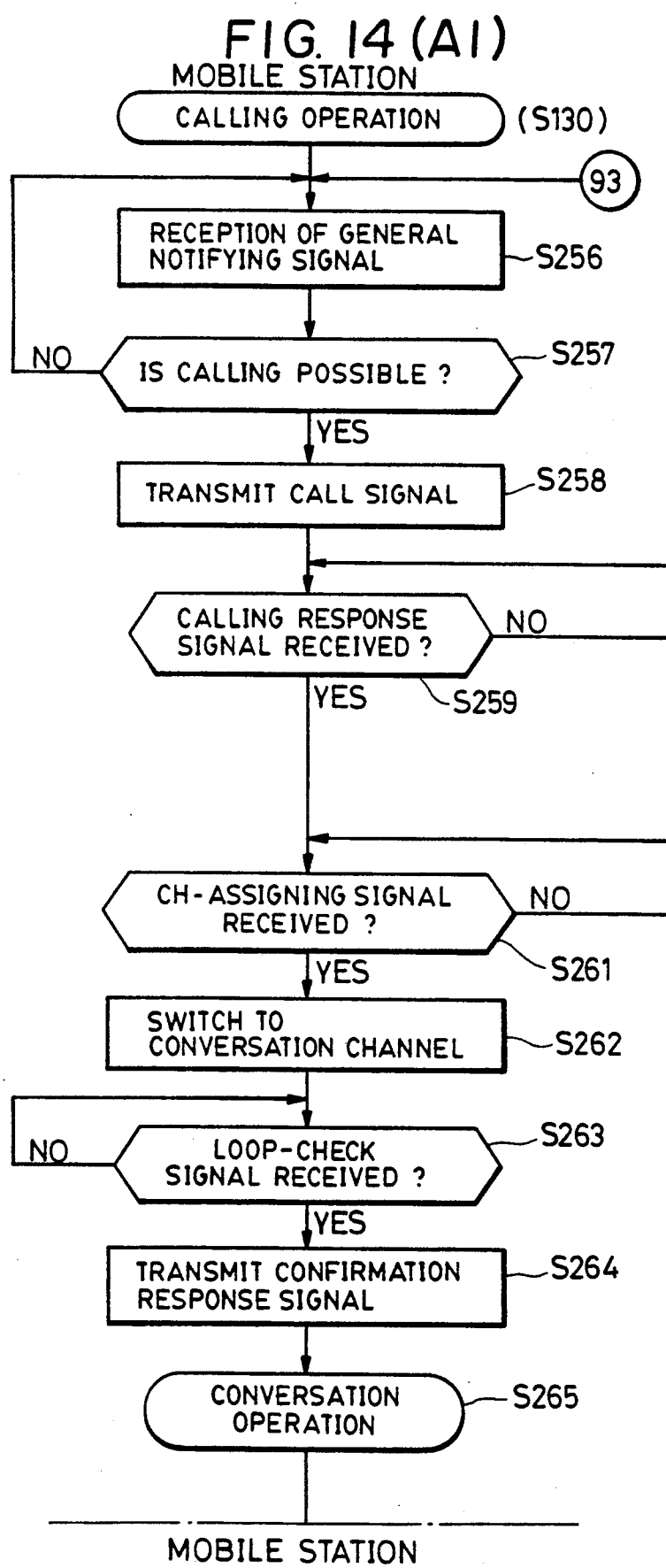

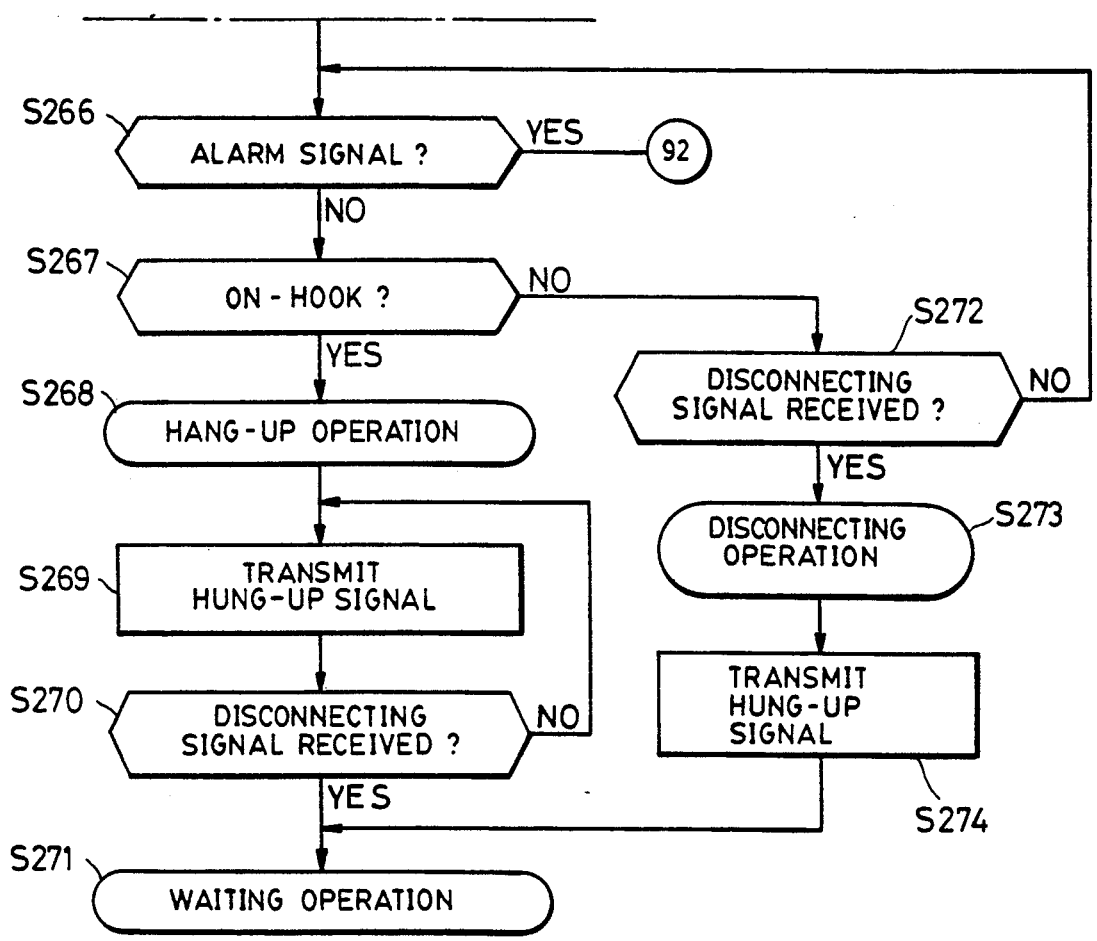

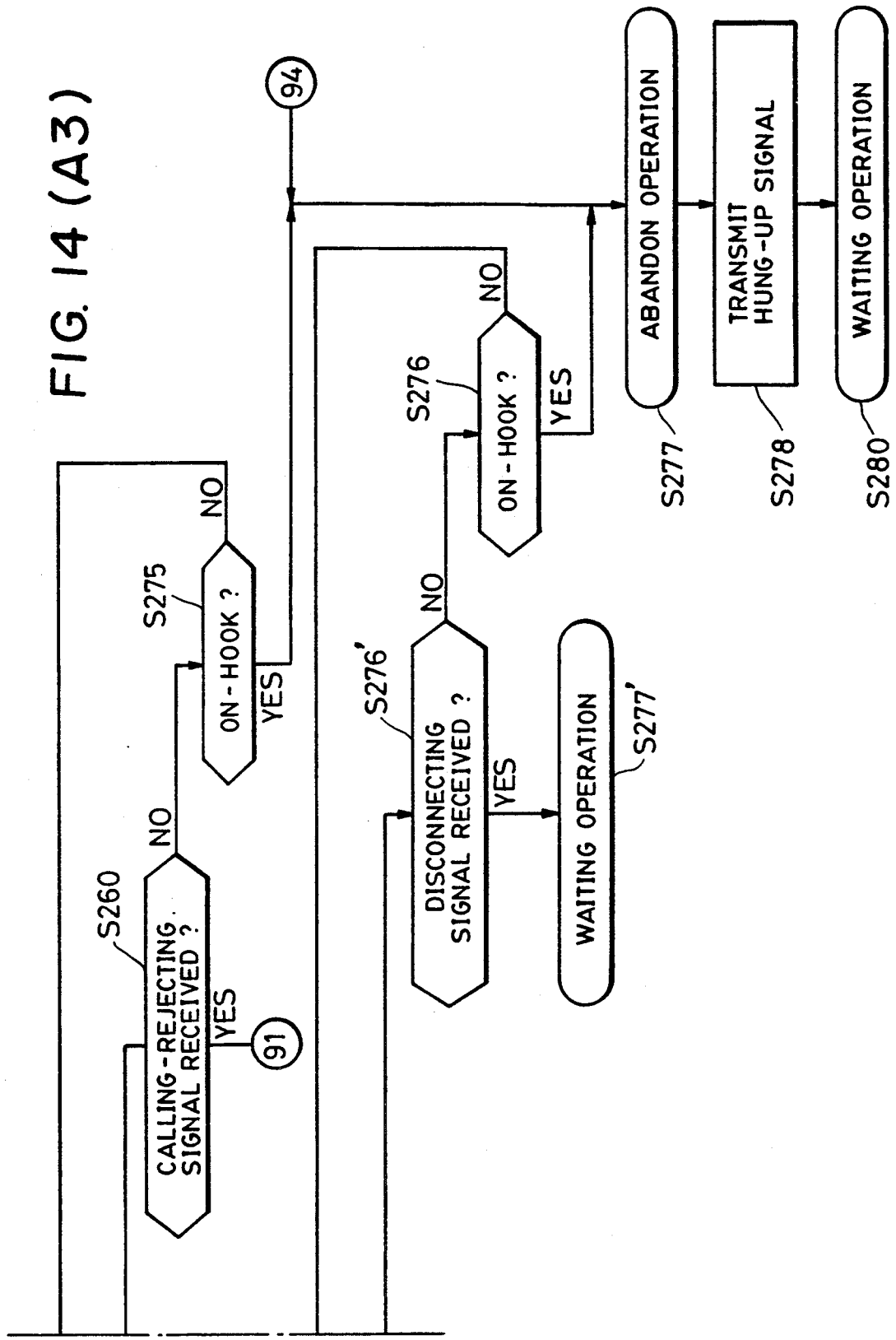

WIRELESS COMMUNICATION SYSTEM

BACKGROUND OF THE INVENTION

1. Field of the Invention

This invention relates to a wireless communication system for performing communication by a wireless method, and more particularly, to a wireless communication system for performing wireless communication with a fixed station connected to a communication network or directly with an exchange.

2. Description of the Prior Art

Heretofore, in telephone communication for performing, for example, voice communication, there have been known various kinds of methods in which wireless communication is performed. They are, for example, a portable radiophone method (transmitting output: a few watts (W)) for performing wireless communication with a direct exchange (base station), such as a car telephone or the like, and a so-called cordless telephone method for performing communication with a network connecting device (base unit) connected to a wired communication network while moving only over a very restricted range such as indoors, using weak radio waves (transmitting output: a few milliwatts (mW)).

Although different communication protocols are used in these wireless telephone methods, the hardware configurations of these mobile terminals are similar. Nevertheless, a conventional device is configured exclusively for either the portable radiophone method or the cordless telephone method.

Consequently, in the case of a portable radiophone, use in a shielded structure is impossible, and in the case of a cordless telephone, conversation cannot be performed if there is not a base unit nearby. Therefore, in order to communicate while moving indoors and outdoors, heretofore, both portable radiophone and cordless telephone must be held. This results in a big investment in communication equipment.

Problems also arise because, although it may not be deemed difficult to unify both functions of the portable radiophone and cordless telephone, troublesome operations, such as switching of switches or the like, are required for selecting either of the functions, and communication cannot be performed if a switch setting is wrong. Moreover, although it is desirable to select cordless telephone communication where there is a base unit nearby and the cordless telephone method can be used, because communication cost is high for the portable radiophone which can be freely moved outdoors, there is a possibility that the expensive portable radiophone method may be selected due to an unoptionized switch setting in a zone where both communication methods are possible.

SUMMARY OF THE INVENTION

It is an object of the present invention to remove the above-described disadvantages of the prior art.

It is a further object of the present invention to provide an improved wireless communication system.

It is a still further object of the present invention to provide a wireless communication system which does not require troublesome operations and which can automatically select an optimum communication method.

It is a still further object of the present invention to provide a communication terminal device which can automatically select a proper method among plural wireless methods in accordance with operation states of plural wireless communication methods having different communication protocols.

It is still a further object of the present invention to provide a wireless communication system comprising wireless communication methods over a short distance and a long distance.

It is still another object of the present invention to provide a wireless communication system which can reduce communication cost.

It is still another object of the present invention to provide a wireless communication system which can store preferential orders of mobile stations when the mobile stations are registered in a fixed station, and which can control calling/call-receiving and communication processing according to the preferential orders.

These and other objects of the present invention will become more apparent from the following detailed description taken in connection with the accompanying drawings.

BRIEF DESCRIPTION OF THE DRAWINGS

FIGS. 11(A), 11(B) and 11(C) are flow charts showing a mobile station call-receiving procedure of a fixed station; FIG. 11(A) is further divided into FIGS. 11 (A1), 11 (A2) and 11 (A3);

FIGS. 12(A) through 12(C) are flow charts showing a mobile-station-calling procedure of a fixed station; FIG. 12(A) is further divided into FIGS. 12 (A1), 12 (A2) and 12 (A3);

FIGS. 14(A) through 14(C) are flow charts of a calling procedure of a mobile station.

DESCRIPTION OF THE PREFERRED EMBODIMENTS

Figure 1:
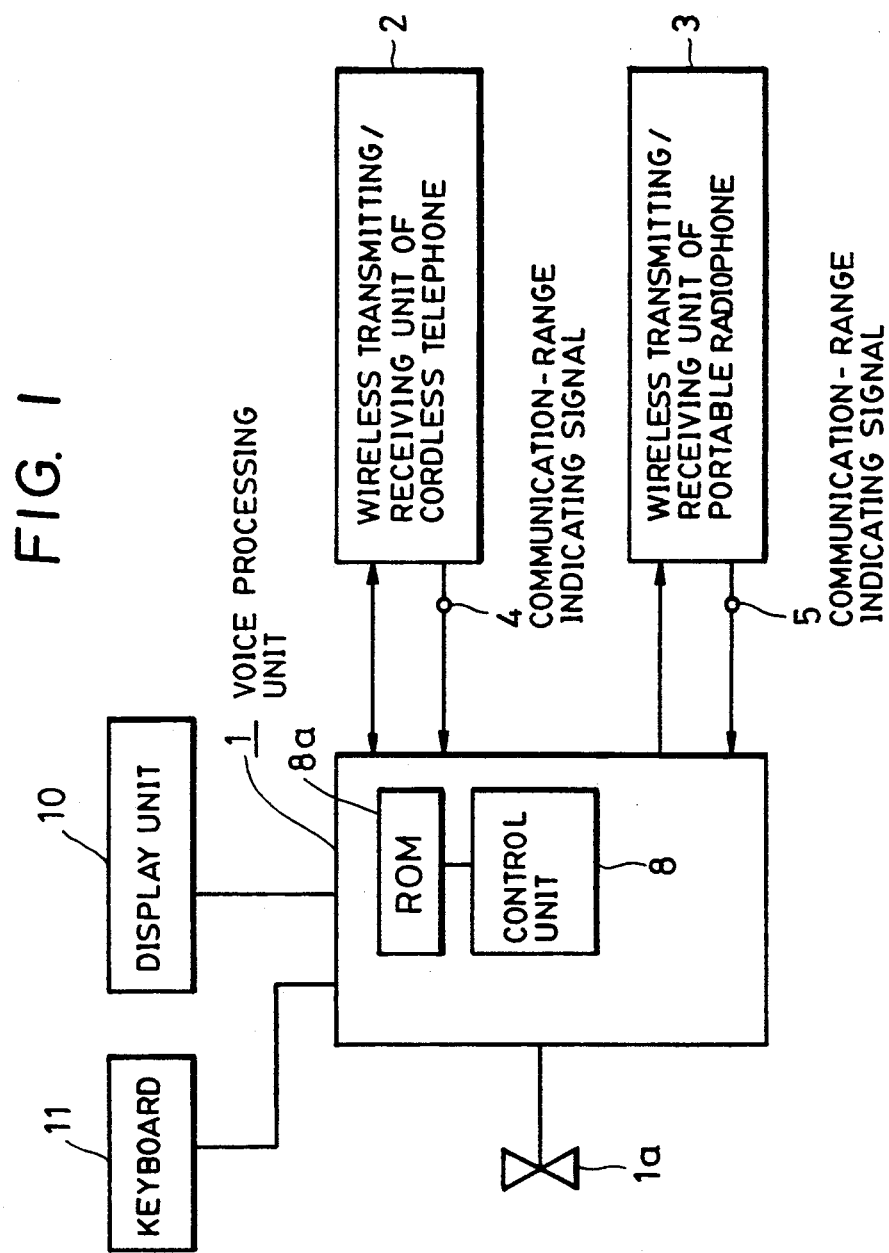
FIG. 1 is a block diagram of a mobile telephone terminal device in a first embodiment.

The present invention will be explained in detail based on the embodiments shown in the drawings.

FIG. 1 shows a block diagram of a mobile terminal of a mobile telephone terminal device which adopts an embodiment of the present invention. In FIG. 1, a voice processing unit 1 for performing conversation via a handset (transceiver) 1a comprises a well-known antisidetone circuit, speech network circuit, calling circuit, call-receiving circuit and the like. In the voice processing unit 1, a control unit 8 comprising a microprocessor and the like is incorporated. A display unit 10 for displaying a telephone number, time, operation state or the like, and a keyboard 11 for inputting a telephone number for calling or the like are also connected to the voice processing unit 1.

In the present embodiment, communication is performed by both the portable radiophone method which directly performs wireless communication with an exchange and the cordless telephone method which is connected to a wired network via a base unit (fixed station). Hence, wireless transmitting/receiving units 2 and 3 of the cordless telephone method and portable radiophone method are provided, respectively.

A cordless telephone is used in general for wireless communication over a short distance, the transmitting output of which is 5 mW for both base unit and satellite unit in Japan's NTT.

On the other hand, a portable radiophone is used for wireless communication over a long distance, and directly performs wireless communication with an exchange. The transmitting output is 5 W at the telephone side, and 25, 10 or 5 W at the exchange side.

In the present embodiment, the control unit 8 detects receiving states of signals at the wireless transmitting/receiving unit 2 of cordless telephone and the wireless transmitting/receiving unit 3 of portable radiophone. The control unit 8 further selects either of the wireless transmitting/receiving units in accordance with the receiving state at each of the wireless transmitting/receiving units 2 and 3, and makes communication possible.

The voice processing unit 1 is connected to the wireless transmitting/receiving unit 3 of cordless telephone and wireless transmitting/receiving unit 3 of portable radiophone by means of well-known interface signals. Particularly, communication-range indicating signals 4 and 5 are input from the wireless transmitting/receiving unit 2 of cordless telephone and wireless transmitting/receiving unit 3 of portable radiophone to the voice processing unit 1.

In both the portable radiophone method and cordless telephone method, it is determined whether or not the mobile terminal is at a location where communication is possible by the method, according to the reception state of a predetermined signal. Communication-range indicating signals 4 and 5 are signals showing the result of the determination. There has hitherto been indicated whether communication is possible or not according to these signals.

In the present embodiment, a proper wireless transmitting/receiving unit is selected from the wireless transmitting/receiving unit 2 or cordless telephone and the wireless transmitting/receiving unit 3 of portable radiophone, using the communication-range indicating signals 4 and 5.

Figure 2:
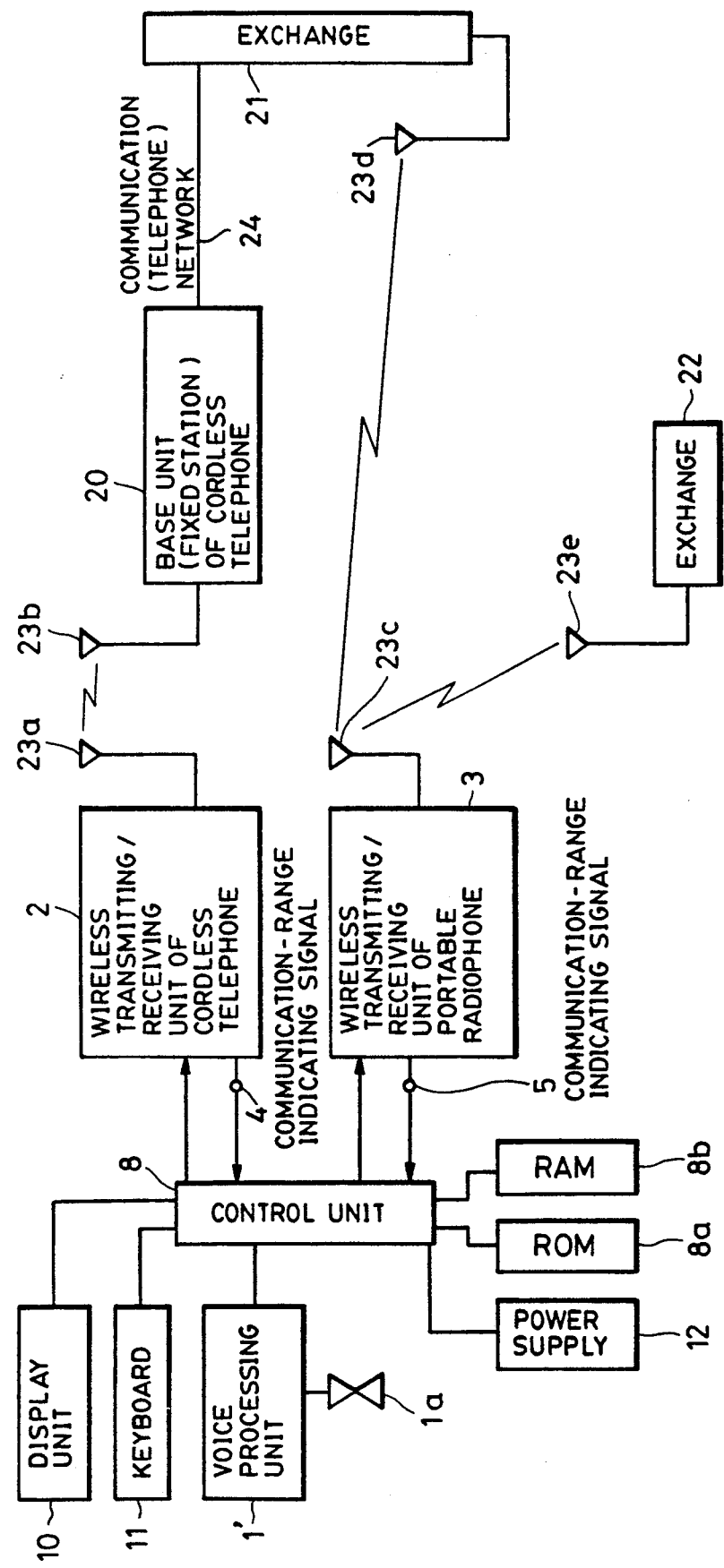
FIG. 2 is a diagram showing a block diagram partly modified from the block diagram shown in FIG. 1, and an example of a system of the first embodiment.

FIG. 2 is a diagram showing a block diagram partly modified from the block diagram shown in FIG. 1 and an example of a system of the present embodiment.

In FIG. 2, like components as in FIG. 1 are indicated by like numerals, and further explanation will be omitted.

A voice processing unit 1' for performing conversation via a handset 1a comprises a speech network circuit, calling circuit, call-receiving circuit and the like. A RAM 8b is used as a memory for the operation of the control unit 8, or stores abbreviated dial keys and the like. A power supply 12 supplies electric power by means of a battery, dry cell or the like so that the device can be moved.

A base unit (fixed station) 20 of a cordless telephone performs wireless communication with the wireless transmitting/receiving unit 2 of cordless telephone via antennas 23a and 23b. The base unit 20 of the cordless telephone is connected to an exchange 21 via a communication (telephone) network 24.

An exchange 21, such as Japan's NTT or the like, performs connection between terminals via the communication network 24, and also performs wireless communication with the wireless transmitting/receiving unit 3 of portable radiophone via antennas 23c and 23e. An exchange 22 is located at a zone different from that of the exchange 21.

When a mobile telephone terminal device controlled by the control unit 8 is moved by the operator, wireless communication can be performed with an exchange located in the neighborhood.

That is, in the present embodiment, when a mobile telephone terminal device can perform wireless communication with the base unit 20 of cordless telephone, the control unit 8 selects the wireless transmitting/receiving unit 2 of cordless telephone, making possible voice communication using the wireless transmitting/receiving unit 2 of the cordless telephone.

When the mobile telephone terminal device is located at a place remote from the base unit 20 of cordless telephone, and wireless communication by the wireless transmitting/receiving unit 2 of the cordless telephone is impossible, the control unit 8 selects the wireless transmitting/receiving unit 3 of portable radiophone, making possible voice communication by the wireless transmitting/receiving unit 3 of portable radiophone.

Figure 3:
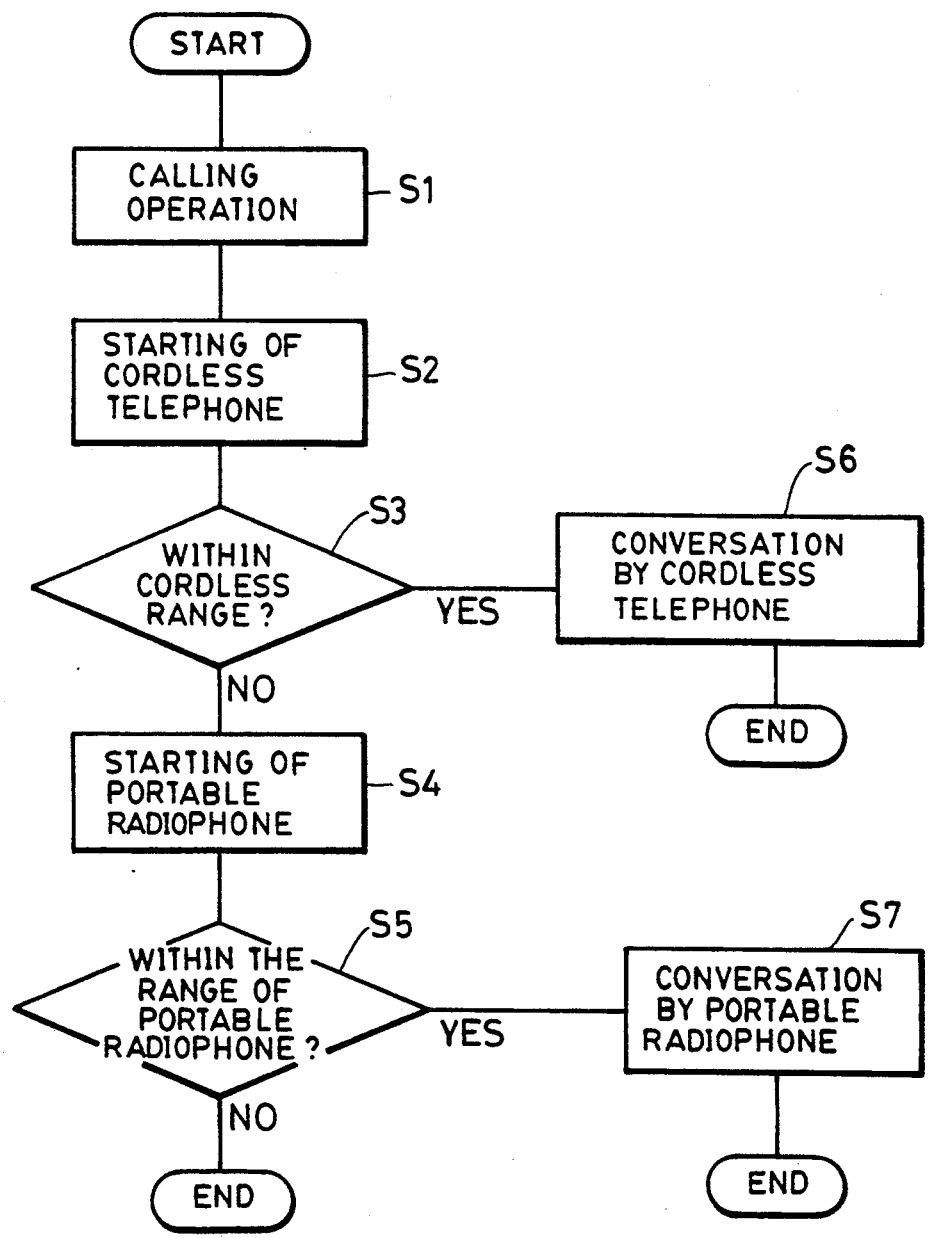
FIG. 3 is a flow chart showing a control procedure of a control unit shown in FIGS. 1 and 2.

FIG. 3 shows a communication control procedure performed by the control unit 8 shown in FIG. 1 or FIG. 2. The procedure shown in FIG. 3 is stored in a ROM 8a.

First, at step S1, the control unit 8 receives calling operation such as telephone number input or the like from the keyboard 11.

Then, at step S2, the wireless transmitting/receiving unit 2 of cordless telephone is started, and an initializing operation is performed so that communication by the cordless telephone method can be performed.

At step S3, it is determined whether the wireless transmitting/receiving unit 2 of cordless telephone is within the range of cordless communication or not, according to the state of the communication-range indicating signal 4 which the wireless transmitting/receiving unit 2 of the cordless telephone outputs. When step S3 is affirmative, the control proceeds to step S6, where communication is performed by the wireless transmitting/receiving unit 2 of cordless telephone using the communication protocol in the cordless telephone method.

On the other hand, when step S3 is negative, the wireless transmitting/receiving unit 2 of cordless telephone cannot be used. Hence, the step proceeds to step S4, where the wireless transmitting/receiving unit 3 of portable radiophone is started.

Then, at step S5, it is determined whether the wireless transmitting/receiving unit 3 of portable radiophone is within the range of communication by the portable radiophone method or not, according to the state of the communication-range indicating signal 5 which the wireless transmitting/receiving unit 3 of portable radiophone outputs. When step S5 is affirmative, the control proceeds to step S7, where communication is performed by the portable radiophone method using the wireless transmitting/receiving unit 3 of portable radiophone.

When step S5 is negative, communication is impossible by either of the cordless telephone and portable radiophone methods. Hence, communication is abandoned, and processing is terminated.

Thus, according to the present embodiment, it is possible to provide a device which has both functions of the cordless telephone method and portable radiophone method in which communication protocols are different.

It is also possible to automatically select a proper communication method utilizing communication-range indicating signals of the wireless transmitting/receiving unit 2 of cordless telephone and the wireless transmitting/receiving unit 3 of portable radiophone, by means of the above-described control method. Hence, operations such as troublesome switching of a switch or the like are unnecessary.

Moreover, since priority is given to the cordless telephone method in the procedure shown in FIG. 3, it is possible to always utilize the cordless telephone method which has lower communication cost whenever the wireless transmitting/receiving unit 2 of cordless telephone can be used. This is advantageous in that communication cost can be minimized.

Figure 4:
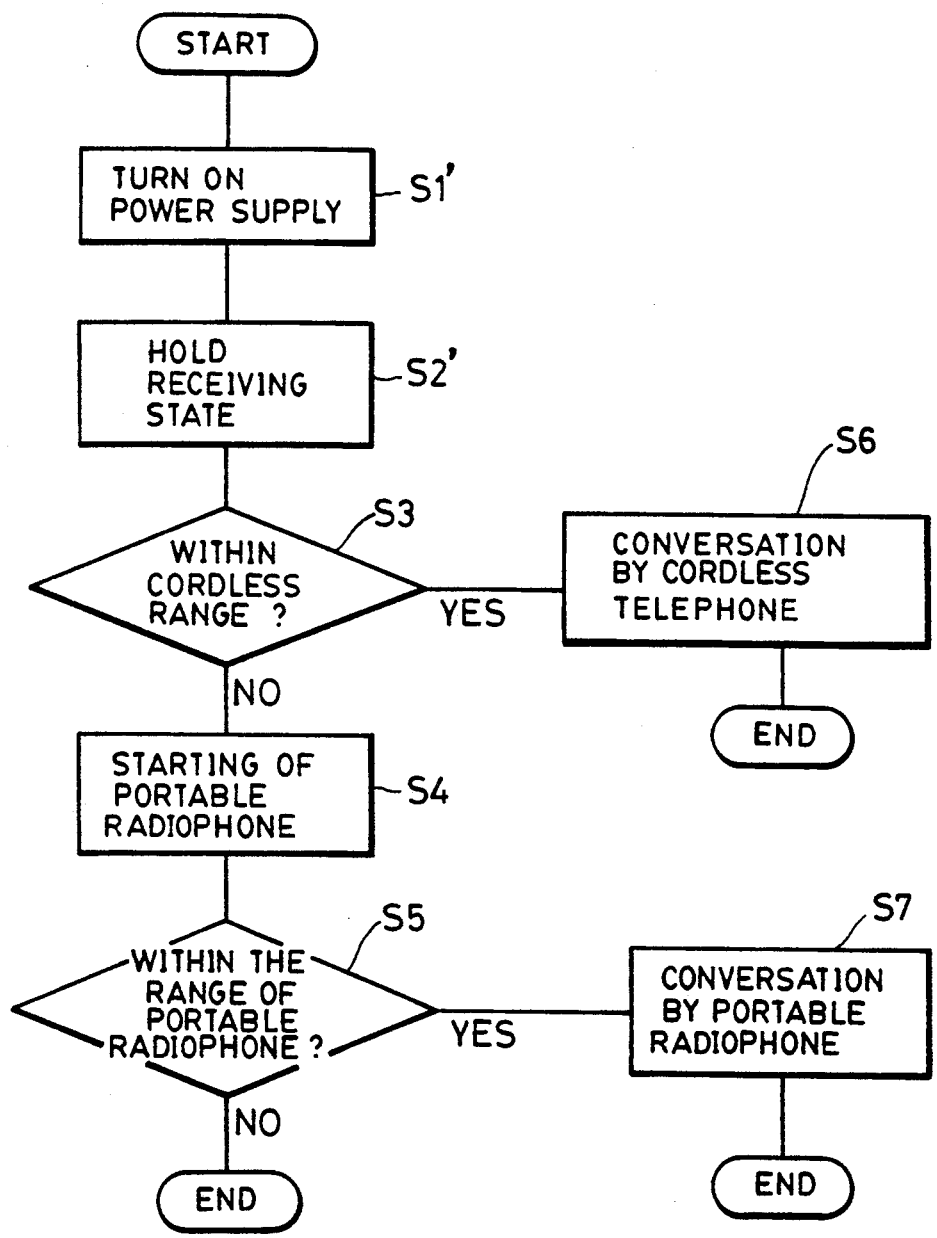
FIG. 4 is a flow chart showing a different control procedure of the control unit.

FIG. 4 shows a different control procedure of the control unit 8. While, in the procedure shown in FIG. 3, a wireless connecting unit is selected after the calling operation has been performed, in FIG. 4, when power from power supplies of the units have been applied at step S1', both the wireless transmitting/receiving unit 2 of cordless telephone and the wireless transmitting/receiving unit 3 of portable radiophone are set in waiting state, that is, in receiving state at step S2.

The wireless transmitting/receiving unit 2 of cordless telephone and the wireless transmitting/receiving unit 3 of portable radiophone continuously monitor the received electric field in receiving state, that is, in waiting state, determining whether they are located within the range capable of communication or not, and generating the communication-range indicating signals 4 and 5. In the present embodiment, these procedures are utilized. That is, selection between the the wireless transmitting/receiving unit 2 of cordless telephone and the wireless transmitting/receiving unit 3 of portable radiophone is performed in waiting state through steps S3–S7. The selection processing at steps S3–S7 is totally the same as that described above.

By means of such control, it is possible to previously select a proper communication method in a waiting state prior to calling. Hence, processing time during calling and call-receiving can be reduced, and a faster processing than that shown in FIG. 3 is possible.

Although the cordless telephone and portable radiophone methods have been illustrated in the foregoing description, any other communication methods may also naturally be used.

As is apparent from the foregoing description, in the present embodiment, there is provided a configuration which comprises plural wireless transmitting/receiving means using different transmitting/receiving protocols, conversation circuits for performing conversations via these wireless transmitting/receiving means, and control means for allowing conversation using a proper wireless transmitting/receiving means between plural wireless transmitting/receiving means in accordance with operation states of the plural wireless transmitting/receiving means. Hence, it is possible to provide an excellent mobile telephone terminal device which can automatically select a proper communication method without any troublesome operation, and which provides low communication cost.

Although, in the present embodiment, explanation has been provided illustrating communication in voice, the present invention is not limited to voice, and can also be used for the communication of image signals or character codes.

Next, as a second embodiment of the present invention, an example in which plural mobile stations can be connected to a base unit (fixed station) of cordless telephone will be explained.

Figure 5:
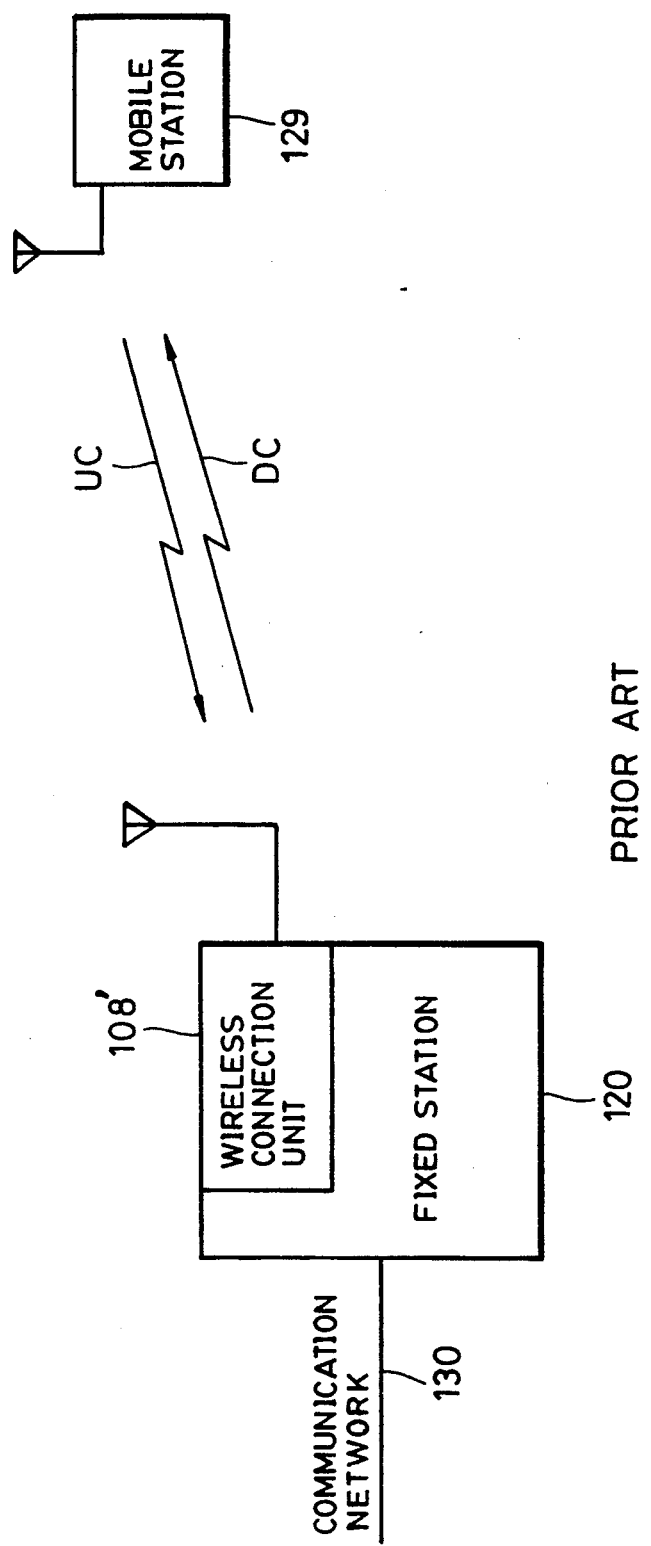
FIG. 5 is a block diagram showing a structure of a conventional cordless telephone system.

There has hitherto been known a cordless telephone in which, as shown in the first embodiment, wireless connection is performed between a fixed station (base unit) connected to a network and a mobile station (satellite unit), and conversation is performed between the mobile station and the network. FIG. 5 shows the structure of a conventional cordless telephone. In FIG. 5, a fixed station 120 is connected to a communication network 130. The fixed station 120 includes a wireless connection unit 108', which performs wireless connection with a mobile station 129 including a similar wireless connecting unit, and inputs and outputs voice signals during conversation. It is possible to perform thereby conversation with (a station in conversation via) the communication network 130 via the mobile station. Since full duplex communication is performed, an up channel UC and a down channel DC using different frequency bands are set as conversation channels between the fixed station 120 and the mobile station 129.

A control channel for controlling calling, call-receiving or a network is also set as well as the conversation channels. The control channel is configured using a frequency band which is different from those of the above-described conversation channels. When one-to-one communication is performed between the fixed station and the mobile station, the control channel is used only when conversation is not performed. Accordingly, is such system, the wireless connection unit 108' of the fixed station 120 and the similar wireless connecting unit of the mobile station are configured so that communication can be performed via either of the conversation channels and control channel by switching of a frequency control circuit or the like.

In the conventional case, a multichannel access (MCA) method is being used, supposing not only one-to-one communication between a fixed station and a mobile station, but also a case in which plural cordless telephone systems are used within the same area, such as a building or the like. The MCA method is a method in which plural communication channels which can be used between a fixed station and a mobile station are set together with conversation channels and a control channel, each channel is scanned at the fixed station or mobile station, and a conversation channel or control channel which is not being used for communication is selected for use.

There has also been considered a method in which ID codes for identifying mobile stations are provided in order to connect plural mobile stations for one fixed station.

Next, the operation of the conventional cordless telephone shown in FIG. 5 will be briefly explained. When calling is performed, for example, from the mobile station 129, a general notifying signal (signal for permission of calling) transmitted from the fixed station is received via the control channel. When it is confirmed that calling is possible, the mobile station 129 transmits a control signal consisting of synchronizing signal, system code, mobile-station ID, calling signal and the like.

When this control signal is received via the wireless connection unit 108', the fixed station 120 performs the collation of the ID code, outputs a calling response signal if a predetermined criterion is satisfied, scans vacant conversation channels, and transmits a signal for assigning a conversation channel to be used for communication.

When the channel-assigning signal is received, the mobile station 129 performs switching from the control channel to the communication channel, and awaits a loop-check signal (connection-confirming signal). When it is confirmed by this signal that wireless connection has been completely performed, the mobile station 129 completes calling connection of wireless connection by transmitting a confirmation response signal, closes the loop of the connected subscriber circuit (in some cases, plural circuits) 130, and performs a calling connection between the subscriber circuit 130 and the mobile station 129.

At this stage, there is provided a state which is the same as when the operator takes the receiver at a normal wired telephone. Now, dial data are transmitted to the fixed station using the conversation channel in accordance with dialing. The fixed station outputs the dial signal transmitted as a voice signal to the communication network 130, and calls a station to be called. Conversation is performed hereafter in the same manner as in the normal telephone.

When conversation has been completed and hanging-up, or "hook-off" of the hand set (or an operation corresponding thereto) is performed at the mobile station 129, a hung-up signal is transmitted from the mobile station 129 using the up channel of the conversation channels. The fixed station 120 thereby opens the loop of the communication network 130, and outputs a disconnecting signal through the down channel to terminate wireless connection processing.

On the contrary, when there is a call-reception at the fixed station 120 through the communication network 130, the fixed station 120 first searches vacant conversation channels with performing channel scan, transmits a channel-assigning signal to the mobile station, and outputs an RG-starting signal (signal for ringing the bell of the mobile station), after confirming wireless connection with the mobile station by performing a loop check of the assigned channel in the same manner as described before.

The mobile station 129 thereby generates a call signal, and awaits the operator hanging up or the time-out of a predetermined waiting time. When there is hook-off, the mobile station 129 transmits a hook-off signal to the fixed station, closes the loop of the communication network 130, and performs conversation operation until there is hook-on, or a disconnecting signal from the fixed station is received.

When a hook-on (lifting of a receiver from its cradle or hook) signal is transmitted from the mobile station 129 on the occasion of termination of conversation, the fixed station 120 transmits a disconnecting signal to the mobile station after opening of the circuit loop, and processing is terminated.

As described above, in the multichannel access method, plural systems comprising a fixed station and mobile stations can be operated within the same zone. In that case, even a mobile station registered in another fixed station can be connected to the network under the equivalent treatment, if only it has been registered in a certain fixed station.

Accordingly, there may happen a case in which, within one fixed-station area, there exist mobile stations exceeding the number of networks to which the fixed station is connected. When, for example, mobile stations which should originally belong to another fixed station are duplicatedly registered in a fixed station in which the same number of mobile stations as the number of networks have already been registered, there results concurrence among mobile stations, giving rise to the problem that initially registered mobile stations have to await a vacancy in networks.

In addition, in the conventional device, relative to a form in which the registration of a mobile station in a fixed station can easily be rewritten, the ID code of the mobile station may be registered using a memory such as a RAM or the like. However, when a memory such as a RAM or the like is used, it is necessary always to provide a power supply to the memory in order to preserve data, and a backup power supply or the like is also required in order to deal with situations such as power failure or the like. These requirements cause the problems that the configuration of the fixed station becomes complicated, and production cost increases.

The second embodiment of the present invention solves the above-described problems.

Now, the second embodiment of the present invention will be explained in detail with reference to the drawings.

Figure 6:
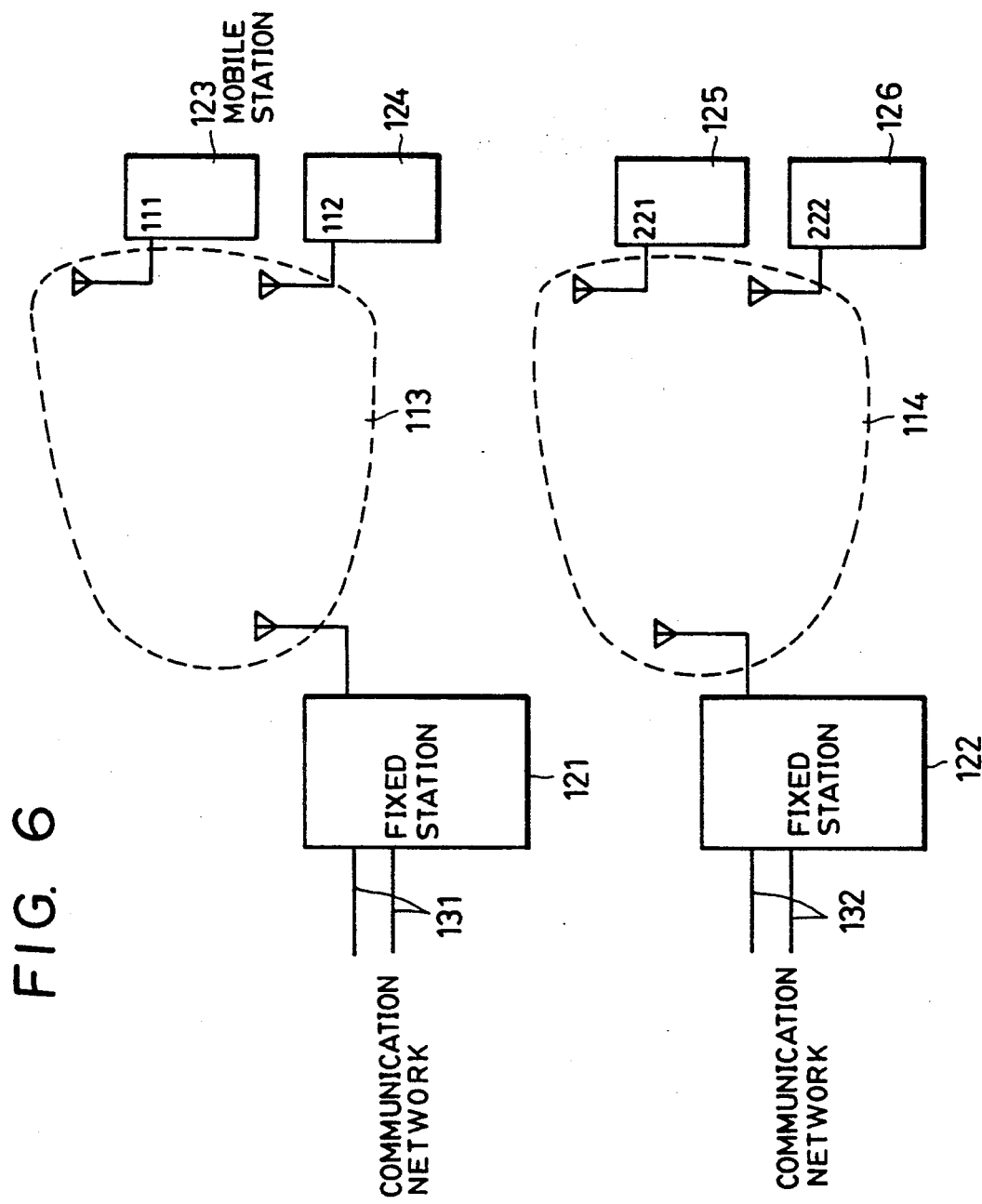
FIG. 6 is a block diagram showing a system configuration of a cordless telephone in a second embodiment of the present invention.

FIG. 6 shows the system of a cordless telephone in which the second embodiment of the present invention is adopted. Here, there are shown two systems each of which comprises one fixed station 121, 122, and two mobile stations 123 and 124, 125 and 126, respectively. In FIG. 6, there are shown wireless zones 113 and 114 of the fixed staions 121 and 122, respectively. The mobile stations 123–126 have ID codes "111", "112", "221" and "222" as shown within each block (three-digit ID codes are used here for the simplification of explanation), respectively, and each of these ID codes is registered in a memory of each mobile station.

The configuration of the mobile stations is the same as before, and hence detailed explanation thereof will be omitted. On the other hand, the fixed stations 121 and 122 are configured as shown in FIG. 7.

Figure 7:
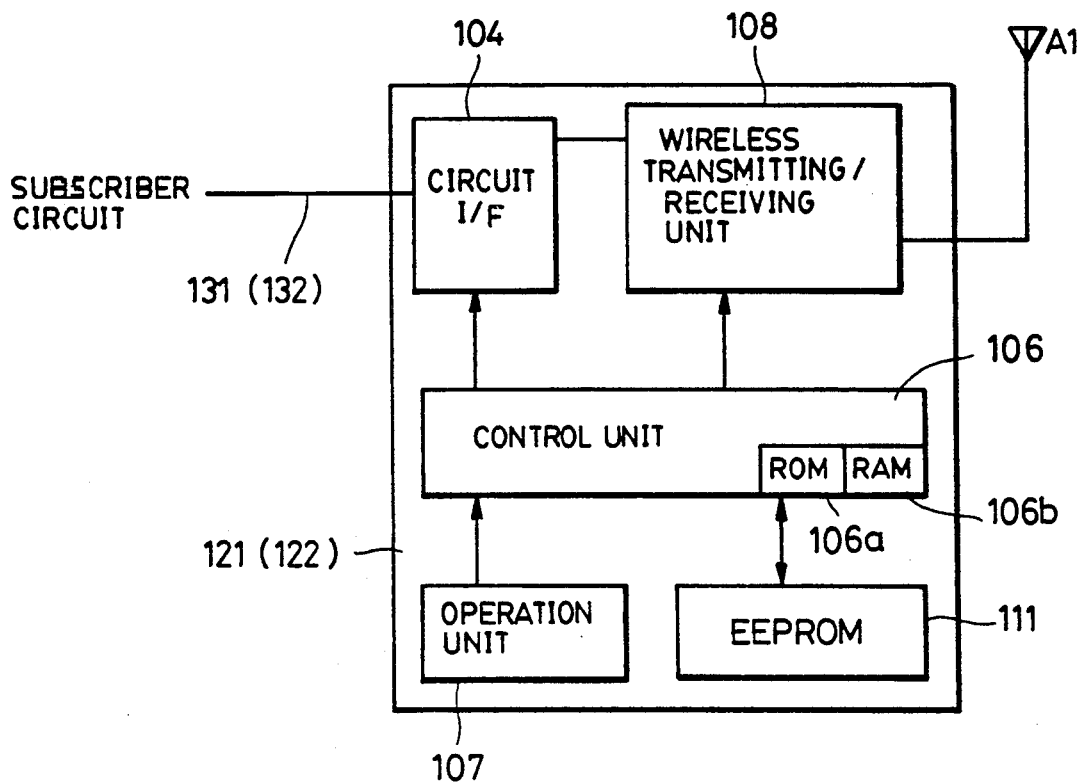
FIG. 7 is a block diagram showing the structure of a fixed station shown in FIG. 1.

In FIG. 7, a communication circuit 131 (or 132) is connected to a circuit-interface circuit 104 of the fixed station 121 (or 122).

The circuit-interface circuit 104 comprises a call-receiving detection circuit, circuit-connection control circuit, speech network circuit and the like. The circuit-interface circuit 104 also includes a dial-signal transmitting unit for transmitting a dial signal (pulse or tone signal) corresponding to dial data provided from the control unit 106 to the communication circuit 131.

The circuit-interface circuit 104 is connected to a wireless connection unit 108. The wireless connection unit 108 comprises a modulator/demodulator, frequency control circuit, transmitting/receiving amplifier and the like. In the wireless connection unit 108, there are provided a conversation-channel transmitting-/receiving circuit which can simultaneously access to a sufficient number of conversation channels that conversation processing of one or plural mobile stations can be performed in accordance with specification, and a control-channel transmitting/receiving circuit which accesses to a full-duplex control channel common to all mobile stations. One transmitting/receiving circuit may also be used by being switched for a control channel and for a conversation channel. An antenna A1 is connected to the wireless connection unit 108.

Operation of the fixed station 121 is controlled by the control unit 106 which comprises a microprocessor and the like. The control unit 106 includes a ROM 106a and a RAM 106b. The ROM 106a is used for storing control programs which are to be described later, and the RAM 106b is used as a work area of the control unit 106. An operation unit 107 which comprises a ten-key and a display unit or a speaker used for generating ringing tone, alarm tone or the like, and the like is connected to the control unit 106. The operation unit 107 is configured as shown in FIG. 8.

Figure 8:
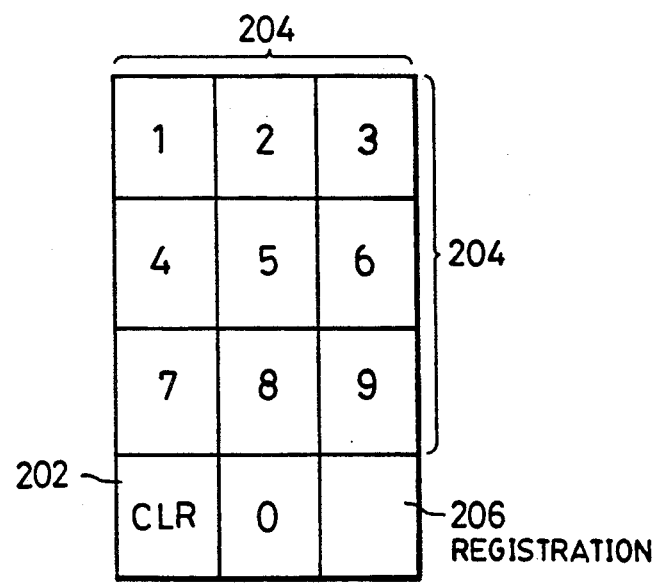
FIG. 8 is an explanatory diagram showing the configuration of an operation unit of a fixed station.

In FIG. 8, there is shown a ten-key 204 for inputting dial data. A registration key 206 and a clear key 202 are provided in a lower portion of the ten-key 204. The registration key 206 is used for controlling the registration of ID codes and preferential orders to be described later of mobile stations in an EEPROM 111. The clear key 202 is used for the above-described registration, data clear of redialing or the like.

In FIG. 6, the fixed stations 121 and 122 can be connected to two communication networks 131 and 132, respectively, and communication can simultaneously be performed between two mobile stations 123 and 124, and 125 and 126, and the networks. In that case, it is also possible to register two or more mobile stations in the fixed stations 121 and 122. It is possible to register, for example, the mobile stations 125 and 126 in addition to the mobile stations 123 and 124 in the fixed station 121.

Figure 9A:
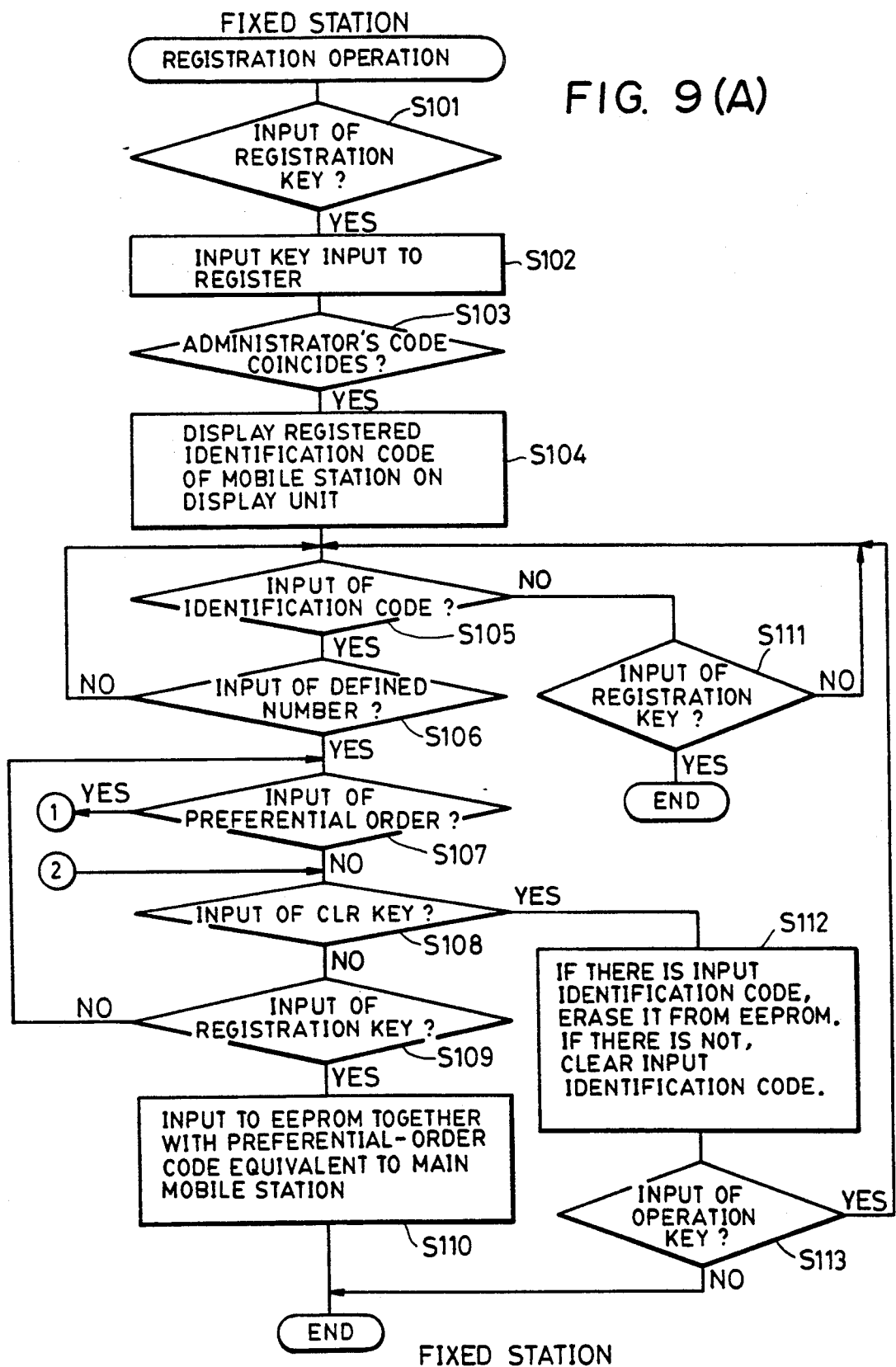
FIGS. 9(A) and 9(B) are flow charts showing a mobile-station registration procedure of a fixed station.
Figure 9:
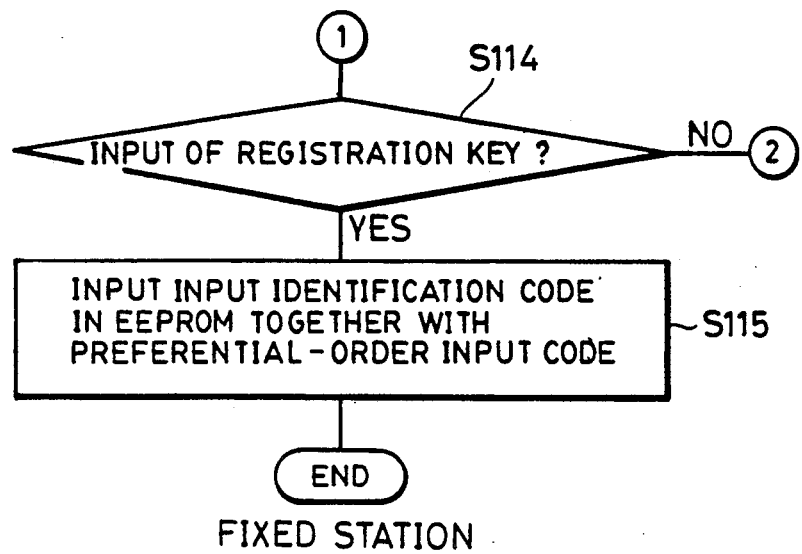

In this case, a mere registration may cause concurrence among mobile stations as described in the explanation of the conventional case, and thus communication may become impossible. Consequently, in the present embodiment, a desired preferential order is set in addition to the identification code on the occasion of the registration of a mobile station through a procedure as shown in FIG. 9, and communication processing is controlled in accordance with the preferential order. Control procedures shown in other figures, and described below, are stored in the ROM 106a in FIG. 7.

When the registration key 206 is depressed as shown in step S101 in FIG. 9 (A), the step proceeds to the registration processing of a mobile station. First, at step S102, data input following the registration key are buffered in a register. Then, at step S103, it is determined whether the input data coincide with a predetermined administrator's code, for example, an undertaker's number of the fixed station to be registered in, a system number or the like. When step S103 is affirmative, the control proceeds to step S104, where identification codes of mobile stations which are now registered are displayed on the display unit of the operation unit 107.

The operator then inputs the ID code and data of a desired preferential order of the newly-registered mobile station. This input is performed by the ten-key 204 shown in FIG. 8, and the input is determined at steps S105-S109.

At step S105, in the case of registering the ID code of a mobile station, for example, newly registering the mobile station 125 or 126 in the fixed station 121, it is determined whether "221" or "222" or the like has been input or not. When the ID code has been input, the step proceeds to step S106. When there has been no input, the step proceeds to step S111.

At step S106, it is determined whether the ID code having a predetermined digit number (3 digits in the case of FIG. 6) has been input or not. When there has been no input of the predetermined digit number, the step returns to step S105. When the ID code having the predetermined digit number has been input, the step proceeds to step S107.

At step S107, it is determined whether the preferential order has been input or not. The preferential order is input, for example, in the form of number such as 1, 2, ---, or the like. When there has been the input of the preferential order, the control proceeds to step S114 shown in FIG. 9 (B). When there has been no input of the preferential order, the control proceeds to step S108. At step S108, it is determined whether the clear key 202 has been depressed or not. When the clear key has been depressed, the control proceeds to step S112. When the clear key has not been depressed, the control proceeds to step S109.

At step S109, it is determined whether the registration key 206 has been depressed again or not. When the registration key has not been depressed, the control returns to step S107. When the registration key has been depressed, the control proceeds to step S110. At step S110, when registration has been performed in the main mobile station, that is, in the fixed station 121 in FIG. 6, an identification code which has been input together with the preferential-order code equivalent to those of the mobile stations 123 and 124 is stored in the EEPROM 111. It is to be noted that, in the case of no assignment of a preferential order, the lowest preferential order, not the highest, may automatically be selected at step S110.

When the clear key 202 has been depressed at step S108, the step proceeds to step S112, where, if there is a registered ID code, the ID code is erased from the EEPROM 111. When there is no registration of ID code, the input identification code is cleared from the register on the buffer. At step S113, it is determined whether there has been any key input or not. If there has not been, registration processing is terminated. If there has been a key input, the control returns to step S105.

Figure 10:
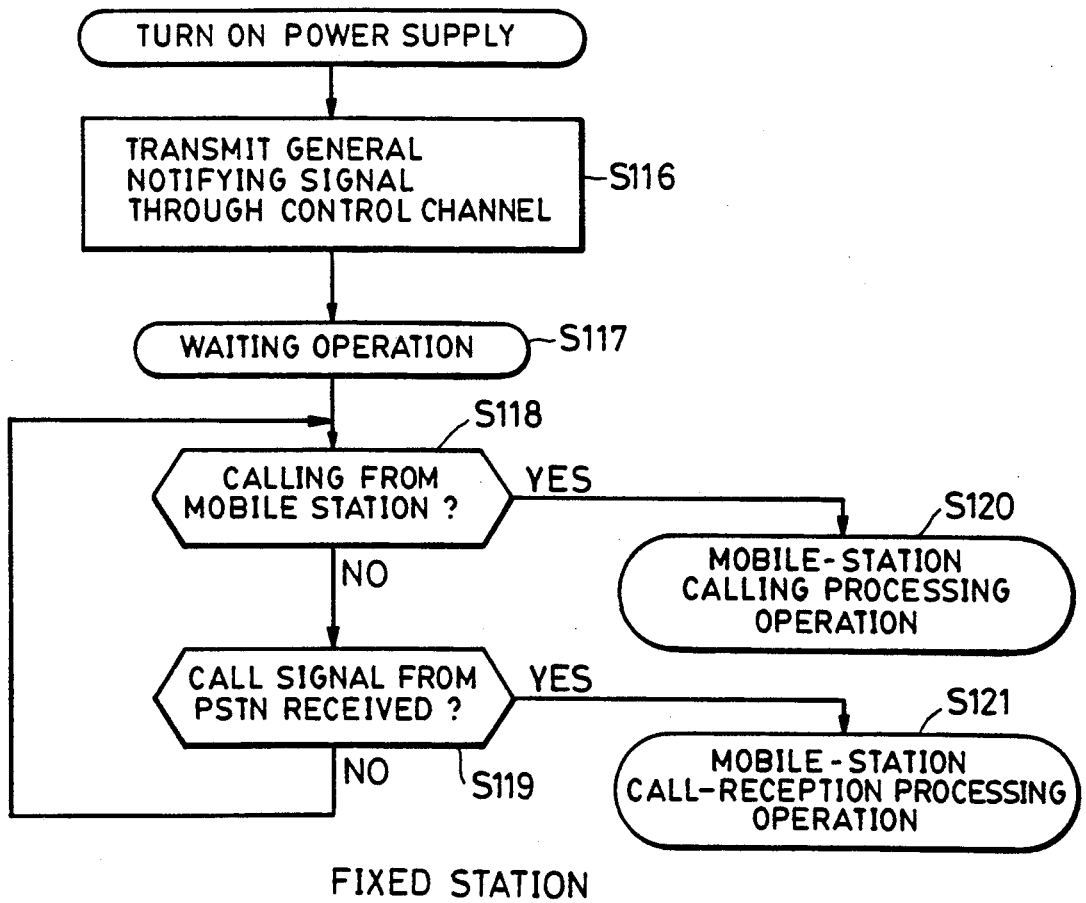
FIGS. 10(A) and 10(B) are flow charts showing basic processing routines of a fixed station and a mobile station, respectively.

On the other hand, when there has been the input of the preferential order at step S107, it is determined whether the registration key 206 has been depressed or not at step S114 in FIG. 9 (B). When the registration key has not been depressed, the control proceeds to step S107. When the registration key has been depressed, the identification code which has been input up of that time is stored in the EEPROM 111 together with the input preferential-order code. As described above, it is possible to perform a registration processing which stores a code indicating a preferential order together with an identification code relative to a certain fixed station in the EEPROM 111. It is possible to control communication by the following procedure, using the registered ID code and preferential order. In FIGS. 10 (A) and 10 (B), there are shown basic processing procedures of a fixed station and a mobile station. The procedure of the fixed station is stored in the ROM 106a, and the procedure of the mobile station is stored in a ROM (not illustrated) or the like connected to the control unit of the mobile station.

When power from the power supply of the fixed station has been applied, the control unit 106 of the fixed station performs the procedure shown in FIG. 10 (A). First, at step S116, a general notifying signal is transmitted through a predetermined control channel. At step S117, then, the control enters a waiting operation. At steps S118 and S119, a calling from the mobile station and the reception of a call signal from the network are determined, respectively. When there has been a calling from the mobile station, processing for calling the mobile station is performed at step S120. When a call signal from the network has been received, the control proceeds to call-reception processing of the mobile station at step S121.

On the other hand, when power from the power supply of the mobile station has been applied, the control unit of the mobile station first performs the initial setting of each unit of the device at step S122 in FIG. 10 (B), and then performs acquisition operation of a control channel at step S123. In this procedure, a certain control channel is selected at step S124, and by determining the system code of the fixed station transmitted to that control channel at step S125, the control proceeds to a waiting operation at step S126. When the system code has not been correct at step S125, channel setting at step S124 is performed again.

In waiting operation, determinations of an off-hook state of the handset, receptions of the channel-assigning signal and call-receiving signal from the fixed station, and whether communication is out of the communication range or not by determining the signal level of the control channel and the like, are performed at steps S127-S129, respectively. In the case of an off-hook state, the step proceeds to calling operation at step S130. When there has been a call-reception, the control proceeds to step S131. When it has been determined that communication is out of the communication range, the control returns to step S123, where setting processing is performed again from the acquisition of a control channel.

Figure 11B:
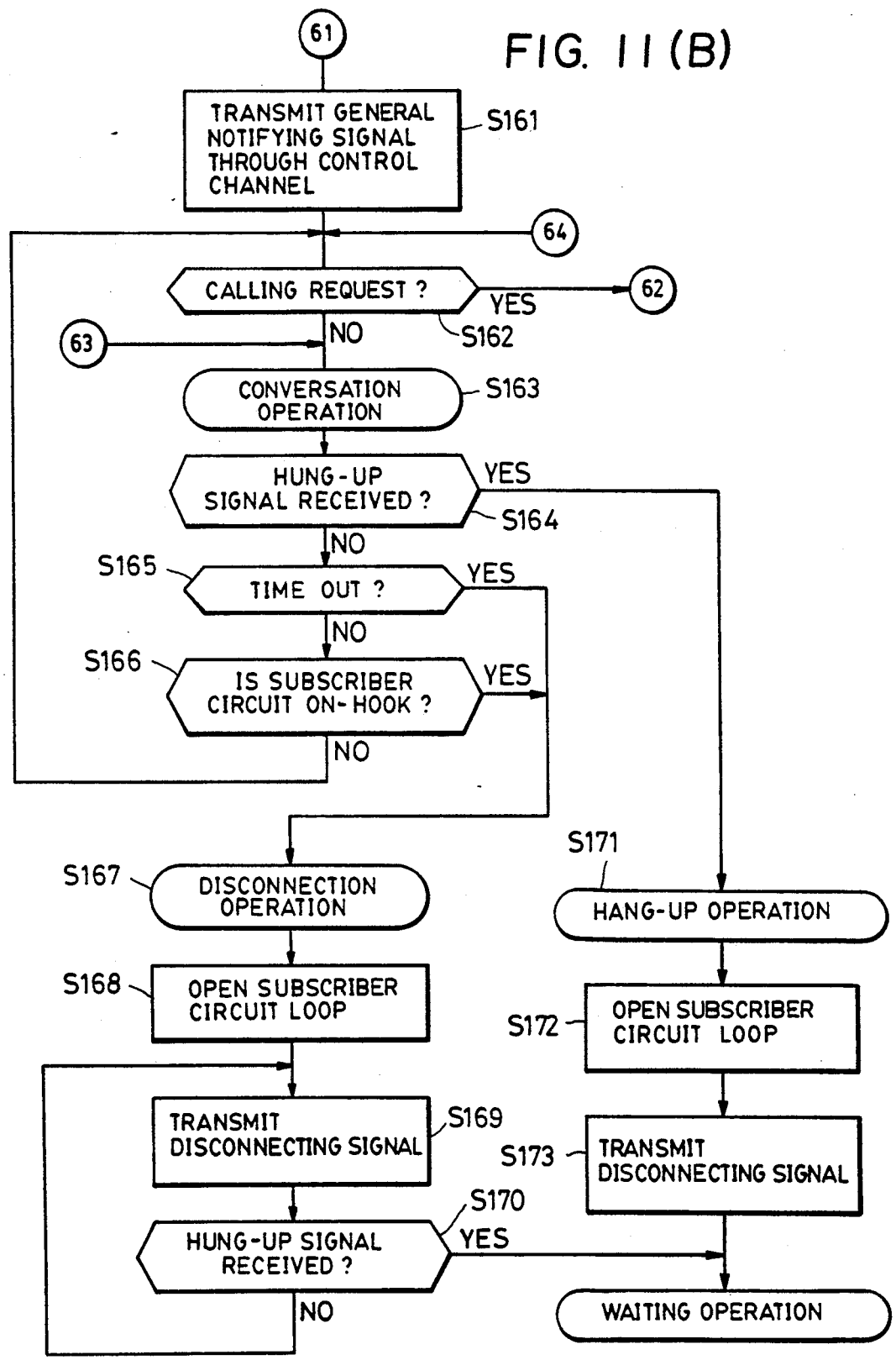
Figure 11C:
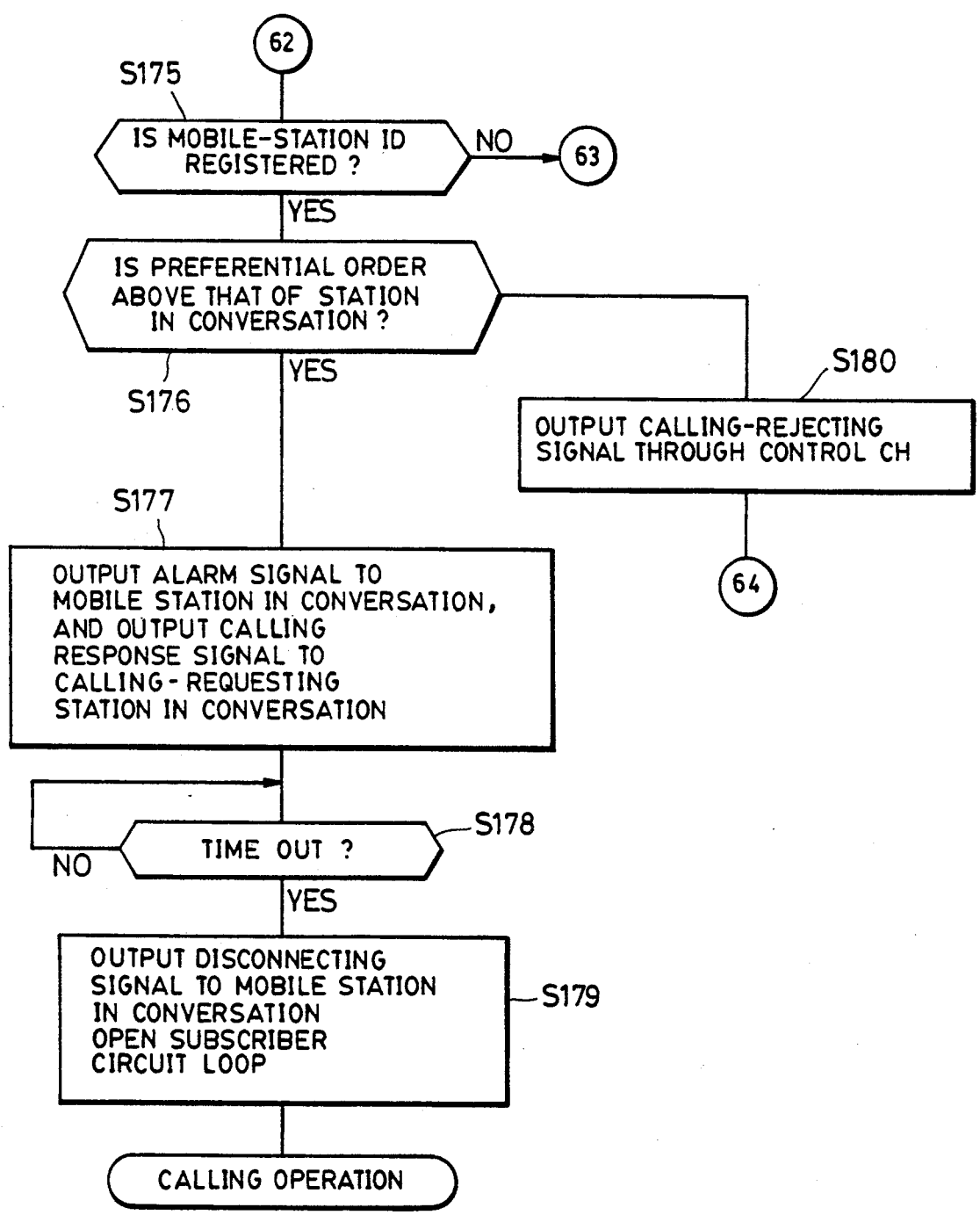

Now, in FIGS. 11 (A)-11 (C), a call-receiving procedure to the mobile station by the fixed station at step S121 in FIG. 10 (A) is shown.

The control unit 106 of the fixed station first determines whether there is a vacancy in conversation channels or not at step S132 in FIG. 11 (A). If there is a vacancy, the loop of the circuit is closed at step S133. At steps S134 and 135, it is determined whether the second dial (the number of the mobile station) has been transmitted from the calling station via the network. When the second dial has been received, it is collated with the ID code stored in the EEPROM 111 at step S136 in order to investigate whether the mobile station has been registered or not. When the mobile station has not been registered, the loop of the circuit is opened at step S138, and the control returns to waiting operation at step S138'.

When the corresponding mobile station has been registered, a channel-assigning signal corresponding to the vacant conversation channel is transmitted to the assigned mobile station by the second dial at step S137, and the loop check is performed at steps S139 and S140. When the confirmation response signal of the loop check has been transmitted from the mobile station, the control proceeds to step S141, where an RG-starting signal is transmitted to the mobile station to generate a ringing tone.

Subsequently, at step S142, an off-hook state of the mobile station is detected. In the case of such off-hook state, the control proceeds to step S143. In the case of the station still being on-hook, time-out of a predetermined call time is determined at step S148. When the call time is not time-out, calling from step S141 is continued. In the case of time-out, opening of the circuit loop, transmission of a disconnecting signal to the mobile station, and reception of a hung-up signal corresponding thereto are respectively performed and determined at steps S149-S151. After proceeding to the reception of the hung-up signal, the control then proceeds to waiting operation at step S152.

When there has been an off-hook state at the mobile station in response to calling, it is determined whether the preferential order of the called mobile station is the highest or not in reference with the EEPROM 111 at step S143. When the preferential order is the highest, the control proceeds to conversation operation at step S144. When the preferential order is not the highest, the control proceeds to step S161.

In the case of the highest preferential order, conversation operation at step S144 is unconditionally performed. When entered in conversation processing, time-out of a predetermined conversation time (this may not be provided), on-hook of the circuit side and a hung-up signal from the mobile station are detected at steps S145-S147, respectively. In the case of time-out and off-hook at the circuit side, the step proceeds to disconnecting processing after step S157. When the hung-up signal has been received, the step proceeds to hang-up operation at step S153. The disconnecting operation is realized at steps S158-S160 by the completely same processing as that in the above-described steps S149-S151.

Hang-up operation is realized by opening of the circuit loop and transmission of a disconnecting signal to the mobile station at steps S154 and S155, respectively. When steps S155 and S160 have been terminated, the step proceeds to waiting operation at step S156.

On the other hand, when the preferential order of the called mobile station is not the highest at step S143, the step proceeds to step S161 in FIG. 11 (B). At step S161, switching to the control channel is performed, and using this channel, a general notifying signal corresponding to a calling permission signal is transmitted. That is, when the station in conversation is not the highest-ranking station, a calling request is made possible even when conversation channels are fully utilized. Then, at step S162, it is determined whether other mobile stations are performing calling request or not. When there is a calling request, the control proceeds to step S175 in FIG. 11 (C). When there is no calling request, the called station is subjected to conversation operation at step S163.

During conversation operation, reception of a hung-up signal, time-out of conversation time and on-hook state of the circuit side are determined at steps S164-S166, respectively. When steps up to step S166 have been performed, with a negative determination in each, the control returns to scanning of other calling stations at step S162. In the case of time-out of conversation time and on-hook of the circuit side, the step returns to disconnection operation at step S167. That is, at steps S168-S170, disconnecting processing is performed by the same processing as that in the above-described steps S140–S151. When a hung-up signal from the mobile station has been received, the step proceeds to hang-up operation at step S171. That is, at steps S172 and S173, the same processing as that in the above-described steps S154 and S155 is performed. When steps S170 and S173 have been terminated, the control proceeds to waiting operation at step S174.

When there is a calling request from another station at step S162 after the commencement of conversation at step S163, the control proceeds to step S175 in FIG. 11 (C), where it is determined whether the ID code of the calling-requesting station is stored in the EEPROM 111 or not. When the calling-requesting station is not registered, the control proceeds to step S163.

When the ID code of the calling station is registered, it is determined whether the preferential order of the calling-requesting station is higher than that of the station in conversation or not. When the preferential order of the calling-requesting station is lower, a calling-rejecting signal is transmitted to the calling-requesting station using the control channel, and calling rejection in performed at step S180.

When the preferential order of the station in conversation is lower, the control proceeds to step S177, where a predetermined alarm signal is output to the mobile station in conversation, and a calling response signal is output to the calling-requesting mobile station to permit calling.

At step S178, waiting for a predetermined time is performed in order to permit the station in conversation, time for terminating the conversation. Then, at step S179, a disconnecting signal is output to the mobile station in conversation to perform disconnection processing in which the circuit loop is opened.

As described above, it is possible to perform call-reception even to a mobile station having a low preferential order, and to interrupt the communication of the mobile station in conversation in accordance with the preferential order when a station having a preferential order which is higher than that of the station has requested a calling during conversation.

Figure 12B:
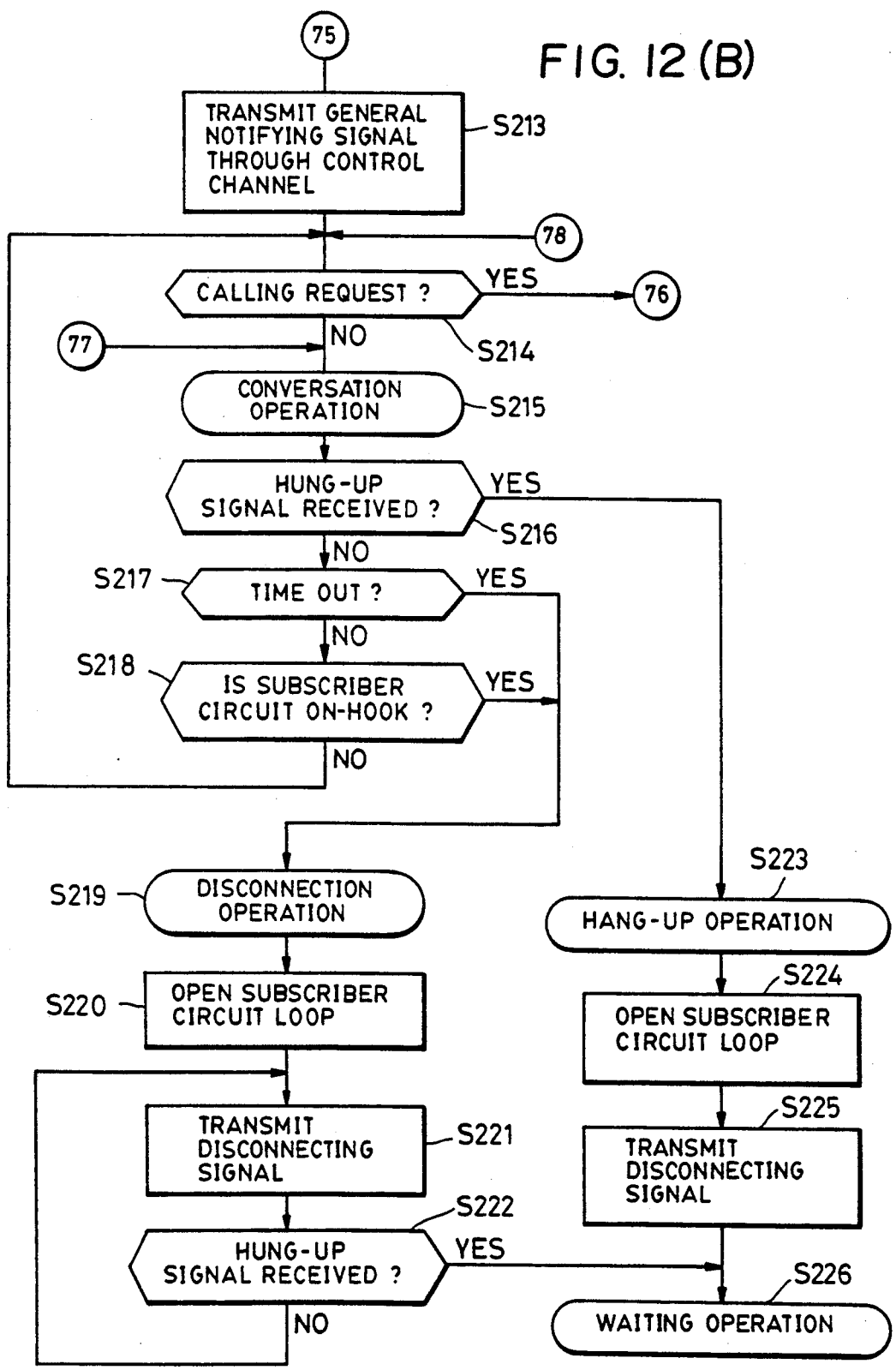
Figure 12C:
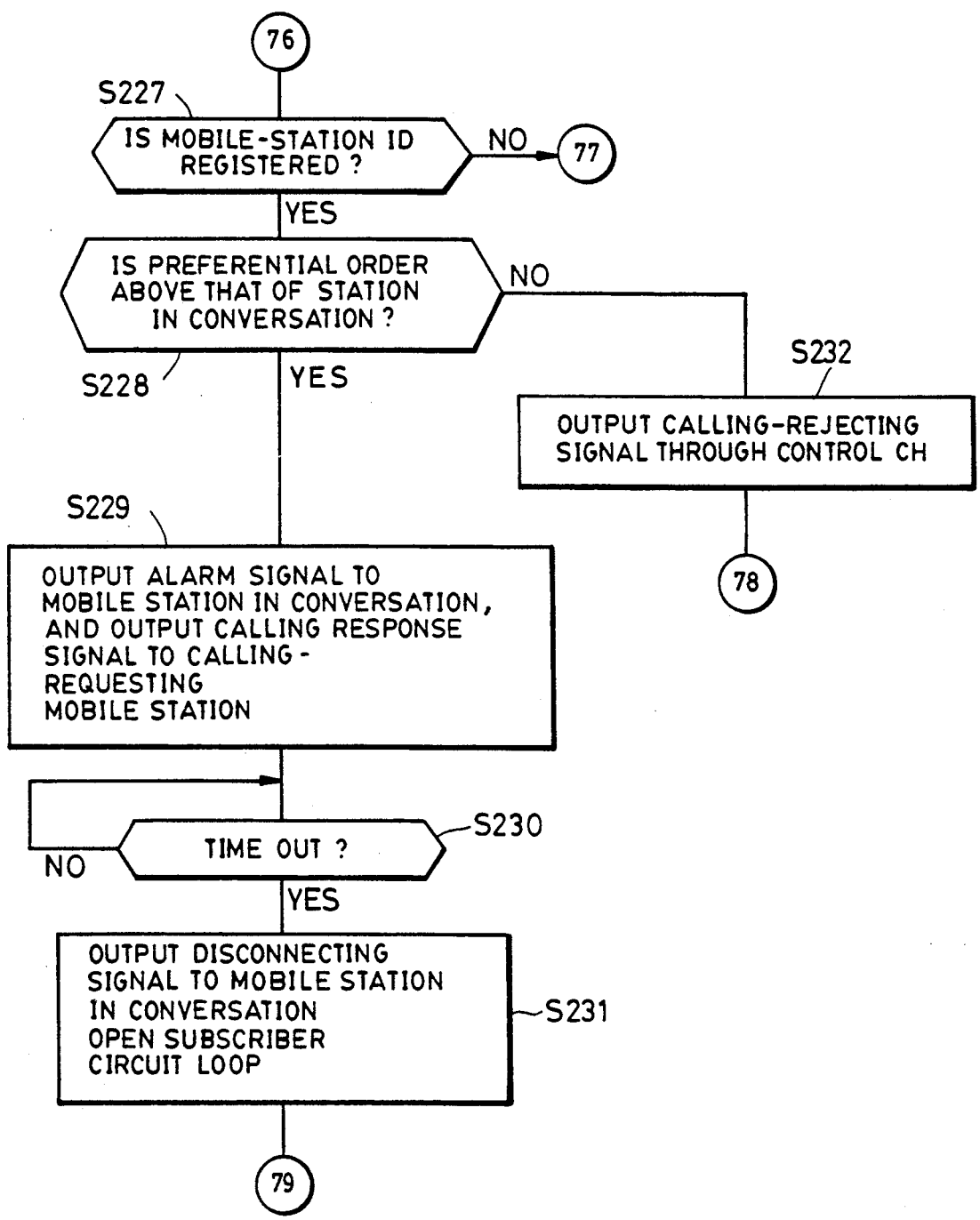

Next, a routine for processing a calling from the mobile station side at step S120 in FIG. 10 (A) is shown in FIGS. 12 (A)–12 (C).

When there is a calling request from the mobile station, it is determined whether the ID code of the calling-requesting station is stored in the EEPROM 111 or not at step S181 in FIG. 12 (A). When the ID code is not registered, the control proceeds to waiting operation at step S182. When the ID code is registered, a calling response signal for permitting a calling is transmitted at step S183.

Then, at step S184, a dial signal for calling the police or a fire department is detected. When such dial signal for emergency is transmitted from the mobile station, the control unconditionally proceeds to step S201, where a vacancy in conversation channels is searched. At step S202, the loop of the circuit is closed, and the input dial signal is immediately transmitted.

When no dialing for emergency has been found at step S184, the circuit loop is closed and the dial signal transmitted from the mobile station is sent out to the circuit at steps 185 and 186, respectively.

At step S187 and the loop of S198–S200, detection of a predetermined time of off-hook state at the circuit side and detection of a hung-up signal of the mobile station are performed. When off-hook state of the circuit side has not been detected during the predetermined time, the control proceeds to waiting operation at step S212. When there has been detected an off-hook state of the circuit side, the control proceeds to step S188, where a calling guide is transmitted to the circuit, and the control then proceeds to wireless connection after step S189.

At step S189, a vacant conversation channel is searched by means of channel scanning. When there is a vacant channel, a channel assigning signal is transmitted to the mobile station to determine a conversation channel to be used, at step S190.

At steps S191 and S192, the loop check of the conversation channel is performed, the control then proceeds to step S193 when wireless connection has been established.

At step S193, it is determined whether the preferential order of the calling mobile station is the highest or not. When the preferential order of the mobile station is not the highest, the control proceeds to step S213 in FIG. 12 (B). When the preferential order is the highest, the control proceeds to step S194.

At step S194, the same conversation operation as that described above is performed. During conversation, at steps S195–S197, detection of a hung-up signal, time-out of conversation time and detection of off-hook at the circuit side (this detection may be omitted when it is intended to reduce the cost of the device) are performed, respectively. When the hung-up signal has been received, entirely the same hang-up operation as that described before is performed at step S208 (the actual operations are steps S209 and S210). In the case of an on-hook state at the circuit side or of a time-out, entirely the same disconnection processing as that described before is performed at step S204 (the actual operations are steps S204–S207). When the disconnecting or hang-up processing has been terminated, the control returns to waiting operation at step S211.

On the other hand, when the preferential order of the mobile station is not the highest, the control proceeds to steps S213 in FIG. 12 (B). Steps S213–S226, and steps S227–S232 in FIG. 12 (C) are entirely the same as steps S161–S180 in FIGS. 11 (B) and 11 (C) for call-reception to the mobile station.

That is, after a general notifying signal has been transmitted at step S213, a calling request of an other mobile station is detected at step S214. When there is a calling request, the control proceeds to step S227 in FIG. 12 (C). When there is no calling request, the control proceeds to conversation processing at step S215. Then, a hung-up signal, time-out of conversation time and an off-hook state of the circuit side are detected at steps S216–S218, respectively. When the hung-up signal has been detected, hang-up operation is performed at step S223 (the actual operations are S224 and S225). In the case of an off-hook state at the circuit side or of a time-out, disconnection processing is performed at step S219 (the actual operations are S220–S222), and the control returns to waiting operation at step S226.

The calling-request detection at step S214 is repeated during conversation, and when there is a calling request, the control proceeds to step S227 in FIG. 12 (C), where the presence of ID registration of the calling-requesting mobile station is detected. When there is no ID registration, the control returns to conversation processing at step S215.

At step S228, the preferential orders of the calling-requesting station and the station in conversation are compared. When the preferential order of the calling-requesting station is lower, the calling request is rejected at step S232, and the step returns to step S214.

When the preferential order of the station in conversation is lower, alarm is generated to the station in conversation, and after waiting for a predetermined time at step S230, the connection of the station in conversation is disconnected, and the control then returns to step S184 in FIG. 12 (A).

As described above, even when a calling has been performed from a mobile station, it is possible to give priority to a calling or conversation of a station having a higher preferential order, by comparing preferential orders.

Next, control at the mobile station side will be explained with reference to the flow charts in FIGS. 13 and 14. The procedures in FIGS. 13 and 14 show programs of a control unit (not illustrated) of the mobile station.

Figure 13:
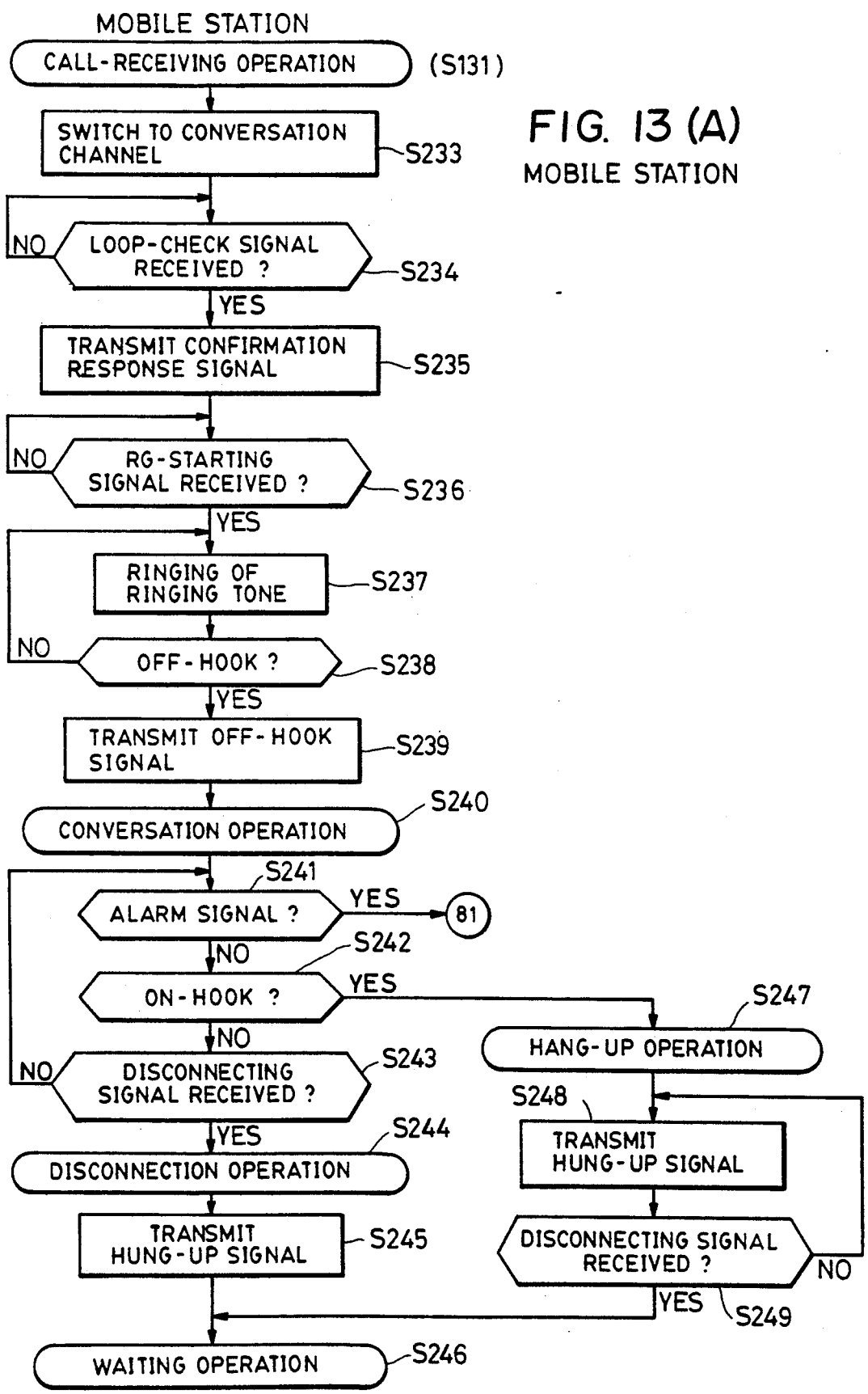
FIGS. 13(A) and 13(B) are flow charts of a call-receiving procedure of a mobile station.
Figure 13:
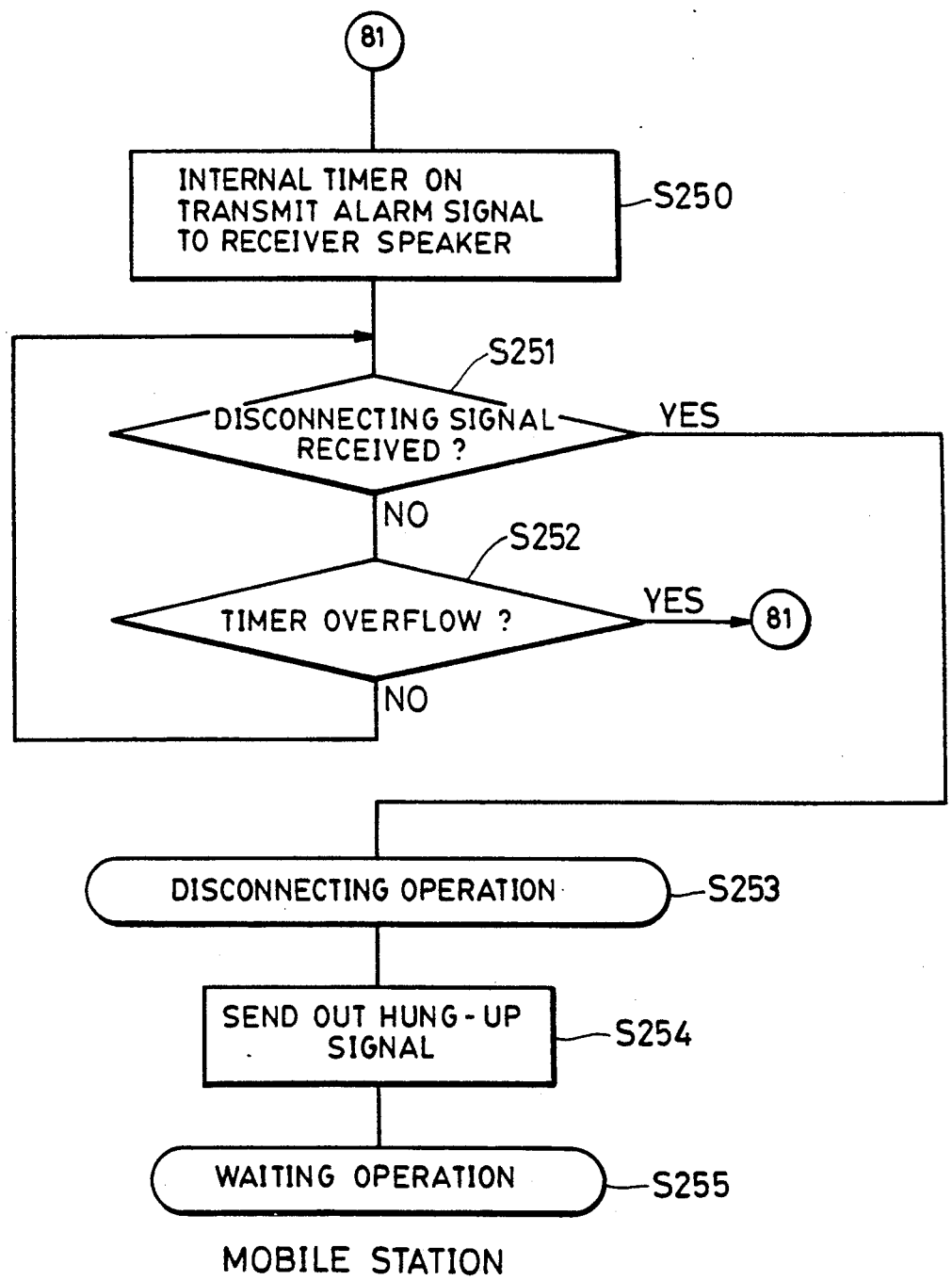
Figure 14:
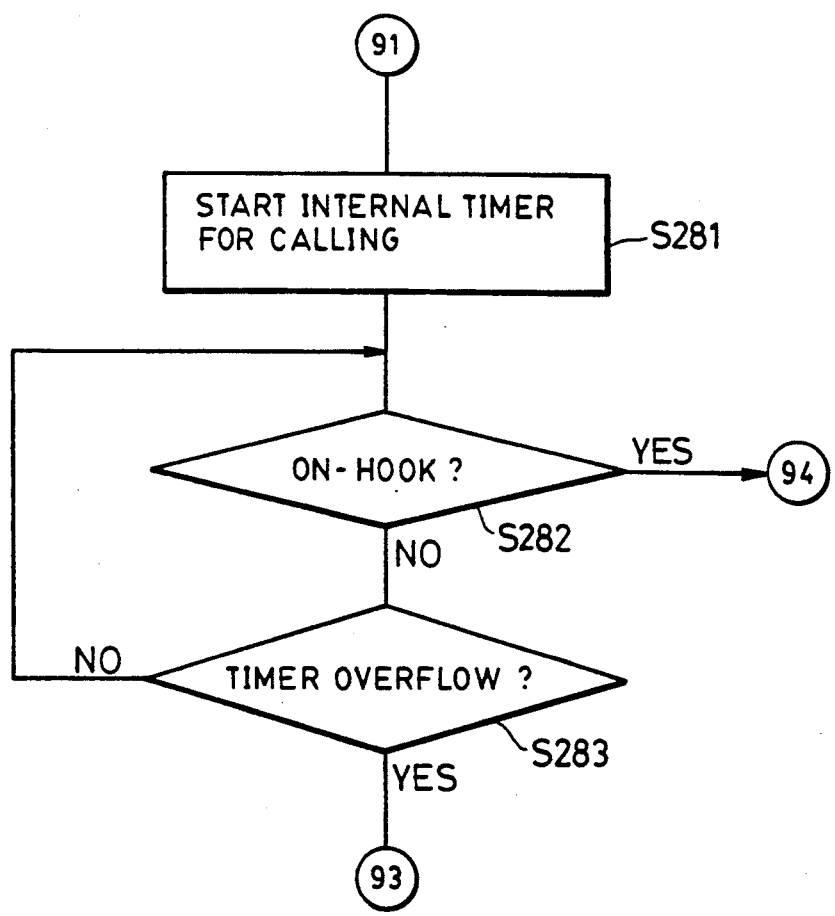
FIG. 14 (A) is further divided into FIGS. 14 (A1), 14 (A2) and 14 (A3).
Figure 14C:
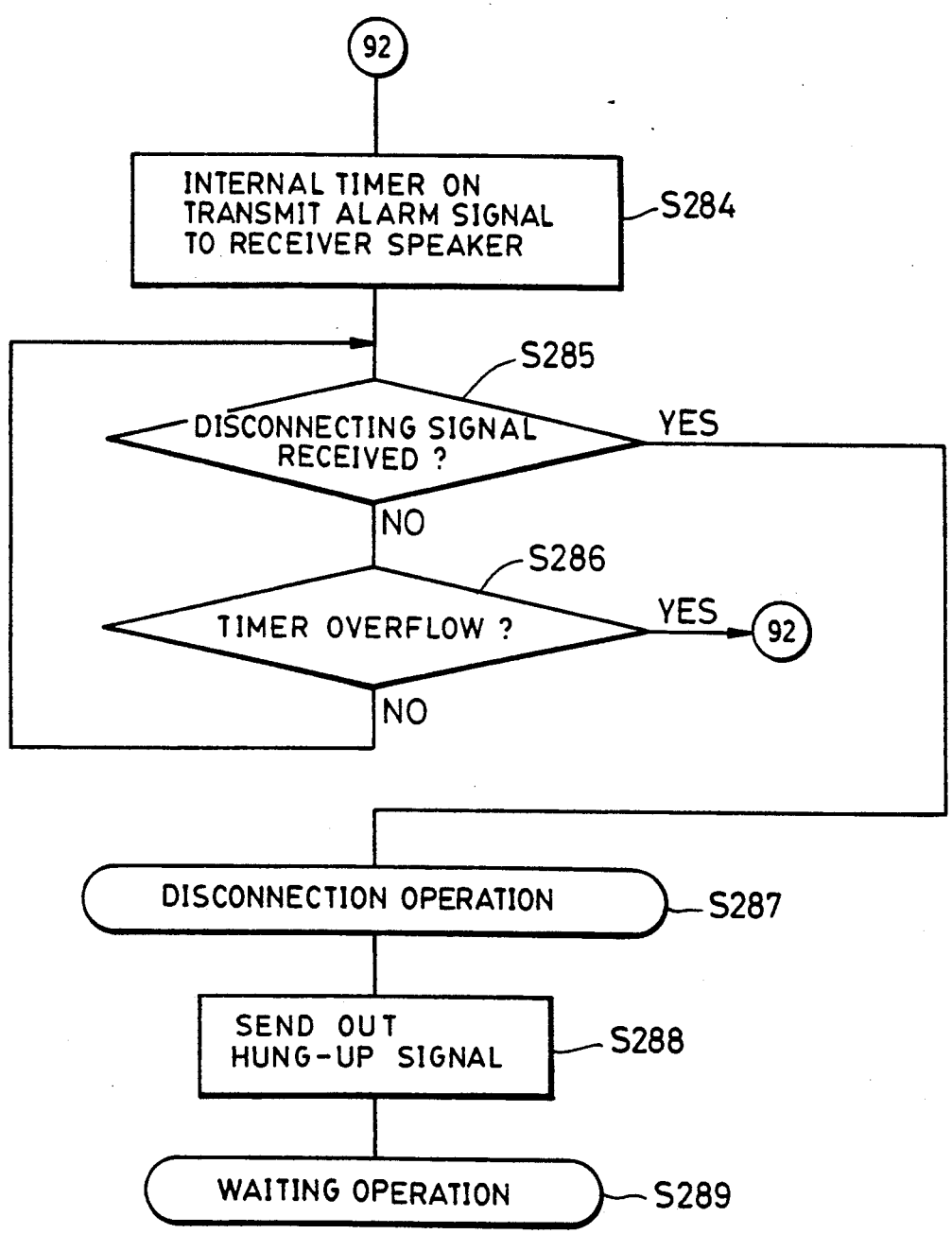

FIGS. 13 (A) and 13 (B) show the call-reception operation of the mobile station at step S131 in FIG. 10 (B).

When channel-assigning and call-receiving commands have been received, the mobile station performs switching to an assigned conversation channel at step S233 in FIG. 13 (A), receives a loop-check signal at step S234, and then transmit a confirmation response signal at step S235.

At step S236, an RG-starting signal is waited. When this signal has been received, the generation of a ringing tone and off-hook operation (receiver pickup) by the operator are awaited at steps S237 and S238, respectively.

When there is an off-hook state, an off-hook signal is transmitted to the fixed station at step S239, and the program then proceeds to conversation processing at step S240.

First, an alarm signal is detected at step S241. This detected signal is transmitted when, as described above, the preferential order of the mobile station in conversation is low, and it is intended to terminate conversation forcibly. When the alarm signal has been transmitted, the control proceeds to step S250 in FIG. 13 (B).

When the alarm signal has not been transmitted, the detection of an on-hook state is performed at step S242. When the operator has effected an on-hook state (hung up the receiver), the control proceeds to hang-up operation at step S247. When there is not an on-hook state, the control proceeds to step S243.

At step S243, it is detected whether a disconnecting signal from the fixed station side has been received or not. When the disconnecting signal has been received, disconnection operation is performed at step S244. That is, a hung-up signal is transmitted to the fixed station at step S245.

On the other hand, in the hang-up operation at step S247, a hung-up signal is transmitted at step S248, and loop processing in which a disconnecting signal from the fixed station is waited is performed at step S249. When the disconnecting signal has been received, the control proceeds to waiting operation at step S246.

When the alarm signal has been received at step S241, an alarm tone is generated from a receiver speaker, and at the same time, a timer comprising a software for repeatedly generating the alarm tone at a predetermined time interval and the like is started to notify the operator that disconnection will be performed, at step S250 in FIG. 13 (B).

Subsequently, in the loop of steps S251 and 252, detection of a disconnecting signal from the fixed station and detection of overflow of the timer started at step S250 are performed, respectively. In the case of overflow of the timer, the control returns to step S250, where alarm tone is generated again. The time interval to be set in the timer may be a suitable time, such as every a few seconds or the like.

When the disconnecting signal has been received, disconnection operation is performed at step S253. That is, a hung-up signal is transmitted at step S254, and the control returns to waiting operation at step S255.

The above-described call-reception processing of the mobile station is the same as that in the conventional case except as to the treatment of an alarm signal. When an alarm signal has been received during conversation, a mobile station having a preferential order higher than that of own station is performing a calling. Hence, an alarm tone is generated at a predetermined time interval until wireless connection is forcibly terminated by the fixed station, to force the termination of conversation.

FIGS. 14 (A)–(C) show the control procedure of calling processing of the mobile station at step S130 in FIG. 10 (B).

The mobile station performs reception of a general notifying signal and detection of calling by means of effecting an off-hook state at steps S256 and S257, respectively.

In the case of calling, the control proceeds to step S258, where a call signal is transmitted to the fixed station.

In the loop of steps S259, S260 and S275, detection of the reception of a calling response signal from the fixed station, detection of a calling-rejecting signal and detection of an on-hook state are performed, respectively. In the case of reception of the calling response signal, the control proceeds to step S261. When the calling-rejecting signal has been received due to the above-described determination of preferential order by the fixed station, the control proceeds to step S281 in FIG. 14 (B). In the case of an on-hook state, the control proceeds to step S276.

At step S261, a conversation-channel assigning signal of the fixed station is detected. When there has been channel assignment, the control proceeds to step S262. When there has been no vacancy in conversation channels and so there has been no channel assignment, the control proceeds to step S276'.

At step S262, the conversation channel is switched to the assigned channel. At step S263, reception of a loop-check signal is detected.

When wireless connection has been confirmed, the control proceeds to conversation processing at step S265. That is, an alarm signal from the fixed station is detected at step S266, and when the alarm signal has been detected, the control proceeds to step S284 in FIG. 14 (C).

In the case of no alarm signal, detections of an on-hook state and a disconnecting signal from the fixed station are performed at steps S267 and S272, respectively. In the case of an on-hook state, hang-up processing is performed at step S268 as in the case of FIG. 13 (A) (the actual operations are transmission of a hung-up signal and detection of a disconnecting signal at steps S269 and S270, respectively). When the disconnecting signal has been received, disconnection operation is performed at step S273 (the actual operation is hung-up signal transmission processing at step S274). When steps S270 and S274 have been terminated, the control proceeds to waiting operation at step S271.

On the other hand, in the case of an on-hook state before wireless connection at step S275, an abandon operation is performed at step S277. That is, a hung-up signal is transmitted to the fixed station at step S278, and the control then proceeds to waiting operation at step S280.

When there has not been a vacancy in conversation channels at step S261, the control proceeds to step S276', where a disconnecting signal from the fixed station is detected. When the disconnecting signal has been detected, the control proceeds to waiting operation at step S277'. When the disconnecting signal has not been received, the operator effecting an on-hook state is detected at step S276. When there is not an on-hook state at step S276, the step returns to detection of a channel-assigning signal at step S261. In the case of on-hook, the control proceeds to an abandon operation at step S277.

When a calling-rejecting signal has been received at step S260, a timer for calling covering a predetermined time is started at step S281 in FIG. 14 (B), and in the detection loop of steps S282 and S283, an on-hook state effected by the operator and overflow of the timer started at step S281 are detected, respectively. In the case of an on-hook state, the control proceeds to step S277 in FIG. 14 (A). In the case of overflow of the timer, the control returns to step S256 in FIG. 14 (A).

On the other hand, when an alarm signal has been received at step S266, alarm tone is generated from the speaker, and at the same time a timer for generating an alarm tone at a predetermined time interval is started at step S284 in FIG. 14 (C), as in the case of FIG. 13 (B). Then, at steps S285 and S286, detection of a disconnecting signal from the fixed station and detection of overflow of the timer started at step S284 are performed, respectively.

When the disconnecting signal has been received, the control proceeds to disconnection operation at step S287. That is, a hung-up signal is transmitted at step S288, and a waiting operation is performed at step S290. When overflow of the timer has been produced at step S286, an alarm tone is generated again at step S250.

As described above, in calling processing of the mobile station, as well as in the case of call-reception processing, a mobile station having a preferential order higher than that of a given station is calling, when an alarm signal has been received during conversation. Hence, an alarm tone is generated at a predetermined time interval until wireless connection is forcibly terminated by the fixed station, to force the termination of conversation.

In the above-described second embodiment, when a mobile station capable of calling and call-reception is registered in the fixed station, the desired preferential order is stored together with the ID code, and communication is controlled according to the preferential order. Hence, it is possible to give priority to the communication of a mobile station having a higher preferential order, even when more mobile stations than the number capable of simultaneous communications have been registered.

Furthermore, since the information about ID codes and preferential orders can be freely modified, flexible use in accordance with the application status of the users is possible.

Moreover, the information about ID codes and preferential orders is stored in the EEPROM of the fixed station, whereby power consumption of the fixed station is reduced, and there is no need of a backup power supply or the like. Hence, the configuration of the device becomes simple and of low cost. In addition, it is possible to maintain securely the registered information even in the case of power failure or the like. If it is arranged so that feeding of electric power to the EEPROM 111 is performed only when the EEPROM is accessed, it is possible to increase the effect of reduction in power consumption.

It is to be noted that, although the configuration of the cordless telephone has been illustrated above, the communication method is not limited thereto. The present invention can also be applied to various kinds of devices, such as a cordless terminal, facsimile or the like performing processing via a similar wireless connection.

As is apparent from the above description, according to the second embodiment of the present invention, in a communication device comprising a fixed station which is connected to a predetermined communication network, and mobile stations which are wirelessly connected to the fixed station and which perform communication of a predetermined method with the communication network via the fixed station, the fixed station is provided with means for storing the identifying information of the mobile stations capable of being connected to the fixed station together with the information indicating the desired preferential orders of the mobile stations, and means for editing the identifying information of the mobile stations and the information relative to the preferential orders of the mobile stations within the storage means, and calling/call-reception and communication processings are controlled according to the preferential orders stored in the storage means. Hence, when the mobile stations are registered in the fixed station, it is possible to control calling/call-reception and communication processings according to the preferential orders. Thus, the present invention provides the excellent effect that, when many mobile stations are registered in the fixed station, it is possible to prevent the occurrence of incapability of communication as much as possible.

While the present invention has been explained in reference to the preferred embodiments, it is not limited thereto. It is apparent that various changes and modifications may be made within the scope of the appended claims.

What is claimed is:

1. A communication terminal device comprising:
plural wireless communication means for communicating using respective different communication protocols including first wireless communication means for preforming wireless communication with a direct exchange using a first communication protocol for long distance and second wireless communication means for performing wireless communication with a base unit connected to a communication line from an exchange using a second communication protocol for a short distance;
selection means for selecting one of the first and second wireless communication means in accordance with the reception states of said plural wireless communication means; and
communication means for performing communication using the wireless communication means selected by said selecting means.

2. A communication terminal device according to claim 1, wherein said first wireless communication means is operable using a protocol for portable radiophone and the second wireless communication means is operable using a protocol for cordless telephone.

3. A communication terminal device according to claim 1, wherein said selection means determines whether a predetermined signal has been received at said plural wireless communication means or not, and selects the wireless communication means of the first and second wireless communication means which receives the predetermined signal according to the result of the determination.

4. A communication terminal device according to claim 2, wherein said selection means preferentially selects the second wireless communication means which has the cordless telephone protocol over first wireless communication means which has the portable radiophone protocol.

5. A communication terminal device according to claim 1, wherein said communication means performs communication by voice using the plural wireless communication means.

6. A wireless communication device comprising:
wireless communication means including long distance wireless communication means for performing wireless communication with a direct exchange having a first communication protocol for a long distance and short distance wireless communication means for performing wireless communication with a base unit connected to a communication line from an exchange having a second communication protocol for a short distance;
determination means for determining the state of reception of a predetermined signal in said wireless communication means; and
selection means for selecting one of said short distance wireless communication means and said long distance wireless communication means in accordance with the result of the determination by said determination means.

7. A wireless communication device according to claim 6, wherein said short distance wireless communication means includes a cordless telephone communication protocol as the second communication protocol, and said long distance wireless communication means includes a portable radiophone communication protocol as the first communication protocol.

8. A wireless communication device according to claim 6, wherein said selection means selects the one of the short distance wireless communication means and the long distance wireless communication means determined by said determination means as having received the predetermined signal.

9. A wireless communication device according to claim 6, wherein said selection means preferentially selects the short distance wireless communication means.

10. A wireless communication device according to claim 6, further comprising communication means for performing communication using the one of the short distance and long distance wireless communication means selected by said selection means.

11. A wireless communication device according to claim 10, wherein said communication means performs communication by voice.

* * * * *

UNITED STATES PATENT AND TRADEMARK OFFICE
CERTIFICATE OF CORRECTION

PATENT NO. : 5,210,785
DATED : May 11, 1993
INVENTOR(S) : HIDEAKI SATO ET AL.

It is certified that error appears in the above-identified patent and that said Letters Patent is hereby corrected as shown below:

COLUMN 3

Line 36, "unit 3" should read --unit 2--.
Line 55, "or" should read --of--.

COLUMN 6

Line 53, "being" should be deleted.

COLUMN 7

Line 50, "with" should read --why--.

COLUMN 13

Line 63, "steps 185" should read --steps S185--.

COLUMN 14

Line 45, "an other" should read --another--.
Line 54, "S224" should read --steps S224--.
Line 57, "S220-S222)," should read --steps S220-S222),--.

COLUMN 15

Line 26, "transmit" should read --transmits--.

UNITED STATES PATENT AND TRADEMARK OFFICE
CERTIFICATE OF CORRECTION

PATENT NO. : 5,210,785
DATED : May 11, 1993
INVENTOR(S) : HIDEAKI SATO ET AL.

It is certified that error appears in the above-identified patent and that said Letters Patent is hereby corrected as shown below:

COLUMN 16

Line 8, "a" should be deleted.

COLUMN 18

Line 55, "preforming" should read --performing--.

COLUMN 19

Line 17, "first" should read --the first--.

Signed and Sealed this

Eleventh Day of April, 1995

BRUCE LEHMAN

Attest:

Attesting Officer

Commissioner of Patents and Trademarks